US012587235B2

(12) United States Patent
Wang et al.

(10) Patent No.: US 12,587,235 B2
(45) Date of Patent: Mar. 24, 2026

(54) WIRELESS COMMUNICATION METHOD AND APPARATUS

(71) Applicant: HUAWEI TECHNOLOGIES CO., LTD., Shenzhen (CN)

(72) Inventors: Xiaolu Wang, Hangzhou (CN); Hejia Luo, Hangzhou (CN); Rong Li, Hangzhou (CN); Jun Wang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 322 days.

(21) Appl. No.: 18/331,950

(22) Filed: Jun. 9, 2023

(65) Prior Publication Data

US 2023/0354438 A1      Nov. 2, 2023

Related U.S. Application Data

(63) Continuation of application No. PCT/CN2021/138217, filed on Dec. 15, 2021.

(30) Foreign Application Priority Data

Dec. 15, 2020     (CN) .......................... 202011476990.8

(51) Int. Cl.
| | |
|---|---|
| *H04B 7/01* | (2006.01) |
| *H04W 56/00* | (2009.01) |
| *H04W 74/0833* | (2024.01) |

(52) U.S. Cl.
CPC ............ *H04B 7/01* (2013.01); *H04W 56/005* (2013.01); *H04W 74/0833* (2013.01)

(58) Field of Classification Search
None
See application file for complete search history.

(56) References Cited

U.S. PATENT DOCUMENTS

| | | |
|---|---|---|
| 2018/0241464 A1 | 8/2018 | Michaels |
| 2019/0075503 A1 | 3/2019 | Bae et al. |

(Continued)

FOREIGN PATENT DOCUMENTS

| | | |
|---|---|---|
| CN | 109874168 A | 6/2019 |
| CN | 110446254 A | 11/2019 |

(Continued)

OTHER PUBLICATIONS

Milan Lukic et al., In-depth Real-World Evaluation of NB-IoT Module Energy Consumption, 2020 IEEE International Conference on Smart Internet of Things (SmartIoT), Aug. 14-16, 2020, 5 pages.

*Primary Examiner* — Saumit Shah

(57) ABSTRACT

Embodiments of this application provide a wireless communication method and an apparatus. The method includes: A first communication apparatus receives first information, where the first information indicates a determining threshold of a parameter in a first parameter set, and the first parameter set includes at least one of the following parameters: location information, delay information, a timing advance rate, a rate of the timing advance rate, a Doppler value, a Doppler rate, and remaining coverage time. The first communication apparatus determines, based on the first information, whether an access condition is met, and performs random access when the access condition is met. This avoids a random access failure in a current cell and re-access in a next cell due to random access performed when the condition is not met.

16 Claims, 11 Drawing Sheets

(56)　　　　　References Cited

U.S. PATENT DOCUMENTS

| | | | | |
|---|---|---|---|---|
| 2020/0305187 A1* | 9/2020 | Takeda | .................. | H04W 72/21 |
| 2021/0409900 A1* | 12/2021 | Wang | .................... | H04W 48/16 |
| 2022/0132593 A1* | 4/2022 | Ren | ..................... | H04W 56/001 |
| 2023/0056527 A1* | 2/2023 | Medles | ............. | H04W 56/0065 |
| 2023/0396323 A1* | 12/2023 | Yavuz | ................ | H04B 7/18513 |

FOREIGN PATENT DOCUMENTS

| | | | |
|---|---|---|---|
| CN | 111405679 A | 7/2020 |
| CN | 111565448 A | 8/2020 |

* cited by examiner

Satellite motion direction

Cell or beam motion direction

Gateway

20° N

0°     40° W          20° W          0°          20° E          40° E

User terminal

Cell

20° S

Line of 20 degrees west longitude

Line of 19.9 degrees west longitude

Line of 19.8 degrees west longitude

WIRELESS COMMUNICATION METHOD AND APPARATUS

CROSS-REFERENCE TO RELATED APPLICATIONS

This application is a continuation of International Application No. PCT/CN2021/138217, filed on Dec. 15, 2021, which claims priority to Chinese Patent Application No. 202011476990.8, filed on Dec. 15, 2020. The disclosures of the aforementioned applications are hereby incorporated by reference in their entireties.

TECHNICAL FIELD

This application relates to the field of communication technologies, and in particular, to a wireless communication method and an apparatus.

BACKGROUND

Satellite communication and the like have significant advantages such as global coverage, long-distance transmission, flexible networking, convenient deployment, and free of geographical condition restrictions. Because a conventional terrestrial network cannot provide seamless coverage, especially in a place in which a base station cannot be deployed, such as a sea, a desert, or the air, the 3rd generation partnership project (3GPP) introduces a non-terrestrial network into a terrestrial network such as a fifth generation mobile communication (5G) system, and attempts to construct space-air-ground communication into a unified communication network.

With development of wireless communication, a fully-connected world is to be realized in the future. The internet of things features delay-insensitivity, massive connections, and wide coverage. Network connections are to be extended to anywhere and between any objects. Integration of the non-terrestrial network (NTN) and the internet of things is an important development direction.

In the internet of things, there are a large quantity of internet of things terminals, costs of the terminals are low, and radio frequency transmit power is not large. To enhance coverage, data is usually repeatedly sent to improve coverage. The internet of things terminal establishes a connection to a network device through random access. For purposes of low costs, protocol simplification, and power saving, when the internet of things terminal enters a coverage area of a cell from a coverage area of another cell, cell handover also needs to be implemented through random access. If a quantity of repeated transmissions is large, time occupied by random access is prolonged. In a scenario of the satellite-integrated internet of things, due to mobility of satellites, an access failure rate is high in an existing random access procedure.

SUMMARY

Embodiments of this application provide a wireless communication method and an apparatus, to implement random access when data sending takes long time, reduce a probability of failed random access, and improve communication efficiency.

According to a first aspect, an embodiment of this application provides a wireless communication method. The method includes: receiving, by a first communication apparatus, first information sent by a second communication apparatus, where the first information indicates a determining threshold of a parameter in a first parameter set, and the first parameter set includes at least one of the following parameters: location information, delay information, a timing advance rate, a rate of the timing advance rate, a Doppler value, a Doppler rate, and remaining coverage time; and determining, based on the first information, whether an access condition is met, and performing random access when the access condition is met.

In this method, before initiating random access, the first communication apparatus determines, based on the first information sent by the second communication apparatus, whether the access condition is met, and performs random access only when the condition is met, to reduce a probability of failed random access. The first information indicates determining thresholds of one or more parameters, and the determining thresholds of these parameters related to a delay, a location, and the like indicate remaining time for a cell/beam of the second communication apparatus to cover the first communication apparatus. This avoids a random access failure caused because coverage time of the cell/beam is less than time of a random access procedure, and avoids low communication efficiency and a waste of power caused by re-access to a system in a next cell/beam.

In a possible implementation, before determining whether the access condition is met, the first communication apparatus obtains a correspondence between the determining threshold of the parameter in the first parameter set and a coverage level and/or service data volume.

Terminals with different coverage levels and/or service data volumes have different quantities of repeated transmissions and also consume different time during system access or data transmission, and therefore, require different remaining coverage time. Defining different determining thresholds based on different coverage levels and/or service data volumes of the terminals can improve determining flexibility and precision, to improve communication efficiency.

In a possible implementation, the determining, based on the first information, whether an access condition is met includes: obtaining first comparison information based on location information of the first communication apparatus and/or location information of the second communication apparatus; and determining, based on the first comparison information and the first information, whether the access condition is met.

The first communication apparatus obtains the first comparison information based on the location information of the first communication apparatus and/or the location information of the second communication apparatus. The first comparison information is a parameter value in the first parameter set, for example, a longitude and latitude value of a current location, a one-way/round-trip delay value between the current location and the second communication apparatus, a timing advance rate value, a rate value of a timing advance rate, a Doppler value, and a Doppler rate value. The first comparison information is compared with the determining threshold indicated by the first information to determine whether the access condition is met. An implementable example of determining the access condition is provided.

In a possible implementation, when a first parameter in the first parameter set has a plurality of determining thresholds, the first communication apparatus obtains a coverage level and/or service data volume of the first communication apparatus, and selects a corresponding determining threshold from the plurality of determining thresholds based on the coverage level and/or service data volume of the first communication apparatus. The determining, based on the first comparison information and the first information, whether the access condition is met specifically includes: determining, based on the first comparison information and the corresponding determining threshold of the first parameter, whether the access condition is met.

The first parameter may be location information, delay information, a timing advance rate, a rate of the timing advance rate, a Doppler value, a Doppler rate, and/or remaining coverage time.

One or more determining thresholds are defined based on one or more coverage levels and/or service data volumes. A terminal selects a corresponding determining threshold based on a coverage level and/or service data volume of the terminal, and compares the determining threshold with the first comparison information to obtain a determining result, so as to determine, more flexibly and accurately, whether the access condition is met.

In a possible implementation, the plurality of determining thresholds include one reference threshold and at least one difference.

When there are a plurality of determining thresholds, one reference threshold and at least one difference represent the plurality of determining thresholds, that is, signaling overheads can be reduced by using a differential method.

In a possible implementation, the determining, based on the first comparison information and the first information, whether the access condition is met includes: comparing the first comparison information with the determining threshold of the parameter in the first parameter set based on a determining condition, and determining whether the access condition is met, where the determining condition corresponds to the determining threshold of the parameter in the first parameter set.

For example, for the determining threshold of the first parameter in the first parameter set, the determining condition is being greater than or equal to the determining threshold, greater than the threshold, less than the determining threshold, less than or equal to the determining threshold, on a same side or an opposite side of a satellite motion direction of a determining threshold contour line, or on the east/west or south/north of a determining threshold contour line. It should be noted that whether the determining condition includes a case of being equal to the determining threshold or a case of being on the determining threshold contour line does not affect the essence of the technical solutions of this application.

In a possible implementation, the first information further indicates the determining condition corresponding to the determining threshold of the parameter in the first parameter set. The first communication apparatus directly obtains the determining condition based on the first information, and complexity is low. Alternatively, the determining condition is a preconfigured condition. For example, a default determining condition is agreed upon according to a communication protocol, so that overheads of signaling sent by the second communication apparatus to the first communication apparatus can be reduced. Alternatively, the determining condition is determined by the first communication apparatus based on the location information and/or a motion direction of the second communication apparatus, so that signaling overheads between the second communication apparatus and the first communication apparatus can be reduced.

In a possible implementation, the location information is longitude and latitude information or information about at least two location points, the at least two location points are used to determine a location threshold line, and the first comparison information includes a location of the first communication apparatus.

In a possible implementation, the delay information is first delay information between a first reference line and the second communication apparatus, the first comparison information includes second delay information between the first communication apparatus and the second communication apparatus, and the second delay information is obtained based on the location information of the first communication apparatus and the location information of the second communication apparatus.

In a possible implementation, the timing advance rate is a first timing advance rate between a second reference line and the second communication apparatus, the first comparison information includes a second timing advance rate between the first communication apparatus and the second communication apparatus, and the second timing advance rate is obtained based on the location information of the first communication apparatus and a location and speed information of the second communication apparatus.

In a possible implementation, the Doppler value is a first Doppler value between a third reference line and the second communication apparatus, the first comparison information includes a second Doppler value between the first communication apparatus and the second communication apparatus, and the second Doppler value is obtained based on the location information of the first communication apparatus and the location and speed information of the second communication apparatus.

In a possible implementation, the first information includes index information, and the index information indicates a determining threshold that is of a parameter in the first parameter set and that corresponds to a cell in which the first communication apparatus is located.

Considering that a satellite orbit is fixed and a cell topology relationship of each satellite is fixed, a location relationship between a cell/beam and a satellite may be associated with a determining threshold and a coverage level and/or service data volume. The first communication apparatus and the second communication apparatus may preconfigure a mapping relationship table, to indicate a relationship between a cell/beam and a determining threshold and a coverage level and/or service data volume. The first communication apparatus may obtain the corresponding determining threshold from the mapping relationship table based on the index information included in the first information. This method can reduce signaling overheads.

According to a second aspect, an embodiment of this application provides a wireless communication method, applied to a second communication apparatus. The method includes: obtaining first information, where the first information indicates a determining threshold of a parameter in a first parameter set, and the first parameter set includes at least one of the following parameters: location information, delay information, a timing advance rate, a rate of the timing advance rate, a Doppler value, a Doppler rate, and remaining coverage time; and sending the first information to a first communication apparatus, so that the first communication apparatus determines, based on the first information, whether an access condition is met.

In the method, the determining threshold of the parameter in the first parameter set is indicated to the first communication apparatus, so that the first communication apparatus determines, based on the determining threshold, whether the access condition is met. Before accessing a system, the first communication apparatus first determines whether the condition is met, and accesses the system only when the condition is met. The location information, the delay information, or timing advance or Doppler value-related information in the first parameter set indicates remaining time for a cell/beam of the second communication apparatus to cover the first communication apparatus. This avoids a random access failure caused because coverage time of the cell/beam is less than time of a random access procedure, and avoids low communication efficiency and a waste of power caused by re-access to the system in a next cell/beam.

In a possible implementation, the first information further indicates a correspondence between the determining threshold of the parameter in the first parameter set and a coverage level and/or service data volume.

Terminals with different coverage levels and/or service data volumes have different quantities of repeated transmissions and also consume different time during system access or data transmission, and therefore, require different remaining coverage time. Defining different determining thresholds based on different coverage levels and/or service data volumes of the terminals can improve determining flexibility and precision, to improve communication efficiency.

In a possible implementation, a first parameter in the first parameter set has a plurality of determining thresholds, and each of the plurality of determining thresholds corresponds to a corresponding coverage level and/or service data volume.

The first parameter may be location information, delay information, a timing advance rate, a rate of the timing advance rate, a Doppler value, a Doppler rate, and/or remaining coverage time.

One or more determining thresholds are defined based on one or more coverage levels and/or service data volumes, so that the first communication apparatus selects a corresponding determining threshold based on a coverage level and/or service data volume of the first communication apparatus, and compares the determining threshold with the first comparison information to obtain a determining result, so as to more flexibly and accurately determine whether the access condition is met.

In a possible implementation, the plurality of determining thresholds include one reference threshold and at least one difference.

When there are a plurality of determining thresholds, one reference threshold and at least one difference represent the plurality of determining thresholds, that is, signaling overheads can be reduced by using a differential method.

In a possible implementation, the first information further indicates a determining condition corresponding to the determining threshold of the parameter in the first parameter set.

For example, for the determining threshold of the first parameter in the first parameter set, the determining condition is being greater than or equal to the determining threshold, greater than the threshold, less than the determining threshold, less than or equal to the determining threshold, on the same side or opposite side of a satellite motion direction of a determining threshold contour line, or on the east/west or south/north of a determining threshold contour line. It should be noted that whether the determining condition includes a case of being equal to the determining threshold or a case of being on the determining threshold contour line does not affect the essence of the technical solutions of this application.

When the first information indicates the determining condition, the first communication apparatus directly obtains the determining condition based on the first information, and complexity is low.

In a possible implementation, the location information is longitude and latitude information or information about at least two location points, and the location points are used to determine a location threshold line. The delay information is first delay information between a first reference line and the second communication apparatus. The timing advance rate is a first timing advance rate between a second reference line and the second communication apparatus. The Doppler value is a first Doppler value between a third reference line and the second communication apparatus.

In a possible implementation, the first information is index information, and the index information indicates a determining threshold that is of the first parameter and that corresponds to a cell in which the first communication apparatus is located.

Considering that a satellite orbit is fixed and a cell topology relationship of each satellite is fixed, a location relationship between a cell/beam and a satellite may be associated with a determining threshold and a coverage level and/or service data volume. The first communication apparatus and the second communication apparatus may preconfigure a mapping relationship table, to indicate a relationship between a cell/beam and a determining threshold and a coverage level and/or service data volume. The index information included in the first information may be used to obtain the corresponding determining threshold from the mapping relationship table. This method can reduce signaling overheads.

According to a third aspect, an embodiment of this application further provides a communication apparatus. The communication apparatus may be used in the first communication apparatus according to the first aspect. The communication apparatus may be a terminal device, an apparatus (for example, a chip, a chip system, or a circuit) in a terminal device, or an apparatus that can be used together with a terminal device. In a possible implementation, the communication apparatus may include modules or units that one to one correspond to the methods/operations/steps/actions described in the first aspect. The modules or units may be hardware circuits, software, or may be implemented by a hardware circuit in combination with software. In a possible implementation, the communication apparatus may include a processing unit and a transceiver unit. The processing unit is configured to invoke the transceiver unit to perform receiving and/or sending functions. For example, the transceiver unit is configured to receive first information sent by a second communication apparatus, where the first information indicates a determining threshold of a parameter in a first parameter set, and the first parameter set includes at least one of the following parameters: location information, delay information, a timing advance rate, a rate of the timing advance rate, a Doppler value, a Doppler rate, and remaining coverage time.

The processing unit is configured to: determine, based on the first information, whether an access condition is met, and perform random access when the access condition is met.

In a possible implementation, before determining whether the access condition is met, the processing unit is further configured to obtain a correspondence between the determining threshold of the parameter in the first parameter set and a coverage level and/or service data volume.

In a possible implementation, when determining, based on the first information, whether the access condition is met, the processing unit is specifically configured to: obtain first comparison information based on location information of the first communication apparatus and/or location information of the second communication apparatus; and determine, based on the first comparison information and the first information, whether the access condition is met.

In a possible implementation, the processing unit is further configured to: when a first parameter in the first parameter set has a plurality of determining thresholds, obtain a coverage level and/or service data volume of the communication apparatus; select a corresponding determining threshold from the plurality of determining thresholds based on the coverage level and/or service data volume of the communication apparatus; and determine, based on the first comparison information and the corresponding determining threshold of the first parameter, whether the access condition is met.

In a possible implementation, the plurality of determining thresholds include one reference threshold and at least one difference.

In a possible implementation, the determining, based on the first comparison information and the first information, whether the access condition is met includes: comparing the first comparison information with the determining threshold of the first parameter based on a determining condition, and determining whether the access condition is met, where the determining condition corresponds to the determining threshold of the first parameter.

In a possible implementation, the first information further indicates the determining condition corresponding to the determining threshold of the first parameter; or the determining condition is a preconfigured condition; or the determining condition is determined by the first communication apparatus based on the location information and/or a motion direction of the second communication apparatus.

In a possible implementation, the location information is longitude and latitude information or information about at least two location points, the at least two location points are used to determine a location threshold line, and the first comparison information includes a location of the first communication apparatus.

In a possible implementation, the delay information is first delay information between a first reference line and the second communication apparatus, the first comparison information includes second delay information between the first communication apparatus and the second communication apparatus, and the second delay information is obtained based on the location information of the first communication apparatus and the location information of the second communication apparatus.

In a possible implementation, the timing advance rate is a first timing advance rate between a second reference line and the second communication apparatus, the first comparison information includes a second timing advance rate between the first communication apparatus and the second communication apparatus, and the second timing advance rate is obtained based on the location information of the first communication apparatus and a location and speed information of the second communication apparatus.

In a possible implementation, the Doppler value is a first Doppler value between a third reference line and the second communication apparatus, the first comparison information includes a second Doppler value between the first communication apparatus and the second communication apparatus, and the second Doppler value is obtained based on the location information of the first communication apparatus and the location and speed information of the second communication apparatus.

In a possible implementation, the first information is index information, and the index information indicates a determining threshold that is of the first parameter and that corresponds to a cell in which the first communication apparatus is located.

It should be noted that for beneficial effects of the implementations of the communication apparatus according to the third aspect of embodiments of this application, refer to beneficial effects of the wireless communication method according to the first aspect. Details are not described herein again.

According to a fourth aspect, an embodiment of this application further provides a communication apparatus. The communication apparatus may be used in the second communication apparatus according to the second aspect. The communication apparatus may be a network device (satellite), an apparatus (for example, a chip, a chip system, or a circuit) in a network device, or an apparatus that can be used together with a network device. In a possible implementation, the communication apparatus may include modules or units that one to one correspond to the methods/operations/steps/actions described in the second aspect. The modules or units may be hardware circuits, software, or may be implemented by a hardware circuit in combination with software. In a possible implementation, the communication apparatus may include a processing unit and a transceiver unit. The processing unit is configured to invoke the transceiver unit to perform receiving and/or sending functions. For example, The processing unit is configured to obtain first information, where the first information indicates a determining threshold of a parameter in a first parameter set, and the first parameter set includes at least one of the following parameters: location information, delay information, a timing advance rate, a rate of the timing advance rate, a Doppler value, a Doppler rate, and remaining coverage time. The transceiver unit is configured to send the first information to a first communication apparatus, so that the first communication apparatus determines, based on the first information, whether an access condition is met.

In a possible implementation, the first information further indicates a correspondence between the determining threshold of the parameter in the first parameter set and a coverage level and/or service data volume.

In a possible implementation, a parameter in the first parameter set has a plurality of determining thresholds, and each of the plurality of determining thresholds corresponds to a corresponding coverage level and/or service data volume.

In a possible implementation, the plurality of determining thresholds include one reference threshold and at least one difference.

In a possible implementation, the first information further indicates a determining condition corresponding to the determining threshold of the parameter in the first parameter set.

In a possible implementation, the location information is longitude and latitude information or information about at least two location points, and the location points are used to determine a location threshold line.

In a possible implementation, the delay information is first delay information between a first reference line and the second communication apparatus.

In a possible implementation, the timing advance rate is a first timing advance rate between a second reference line and the second communication apparatus.

In a possible implementation, the Doppler value is a first Doppler value between a third reference line and the second communication apparatus.

In a possible implementation, the first information is index information, and the index information indicates a determining threshold that is of the first parameter and that corresponds to a cell in which the first communication apparatus is located.

It should be noted that for beneficial effects of the implementations of the communication apparatus according to the fourth aspect of embodiments of this application, refer to beneficial effects of the wireless communication method according to the second aspect. Details are not described herein again.

According to a fifth aspect, an embodiment of this application further provides a communication apparatus, including a processor configured to execute a computer program or executable instructions stored in a memory. When the computer program or the executable instructions are executed, the apparatus is enabled to perform the method in the first aspect and the possible implementations of the first aspect.

In a possible implementation, the processor and the memory are integrated together.

In another possible implementation, the memory is located outside the communication apparatus.

The communication apparatus further includes a communication interface. The communication interface is for communication between the communication apparatus and another device, for example, for data and/or signal sending or receiving. For example, the communication interface may be a transceiver, a circuit, a bus, a module, or another type of communication interface.

According to a sixth aspect, an embodiment of this application further provides a communication apparatus, including a processor configured to execute a computer program or executable instructions stored in a memory. When the computer program or the executable instructions are executed, the apparatus is enabled to perform the method in the second aspect and the possible implementations of the second aspect.

In a possible implementation, the processor and the memory are integrated together.

In another possible implementation, the memory is located outside the communication apparatus.

The communication apparatus further includes a communication interface. The communication interface is for communication between the communication apparatus and another device, for example, for data and/or signal sending or receiving. For example, the communication interface may be a transceiver, a circuit, a bus, a module, or another type of communication interface.

According to a seventh aspect, an embodiment of this application further provides a communication apparatus, including an input/output interface and a logic circuit. The input/output interface is configured to input or output a signal or data. The input/output interface is specifically configured to receive first information. The logic circuit is configured to perform the method in any one of the first aspect and the possible implementations of the first aspect, to determine, based on the first information, whether an access condition is met, and perform random access when the access condition is met.

According to an eighth aspect, an embodiment of this application further provides a communication apparatus, including an input/output interface and a logic circuit. The input/output interface is configured to input or output a signal or data. The logic circuit is configured to perform the method in any one of the second aspect and the possible implementations of the second aspect, to determine first information. The input/output interface is specifically configured to output the first information.

According to a ninth aspect, an embodiment of this application further provides a computer-readable storage medium. The computer-readable storage medium stores a computer program. When the computer program is executed by a processor, a part or all of the steps of the method according to the first aspect and any possible implementation of the first aspect, or the second aspect and any possible implementation of the second aspect are performed.

According to a tenth aspect, an embodiment of this application further provides a computer program product including executable instructions. When the computer program product runs on user equipment, a part or all of the steps of the method according to the first aspect and any possible implementation of the first aspect, or the second aspect and any possible implementation of the second aspect are performed.

According to an eleventh aspect, an embodiment of this application further provides a chip system. The chip system includes a processor, may further include a memory, and is configured to implement the method according to the first aspect and any possible implementation of the first aspect, or the second aspect and any possible implementation of the second aspect. The chip system may include a chip, or may include a chip and another discrete component.

According to a twelfth aspect, an embodiment of this application further provides a communication system, including the first communication apparatus according to the third aspect and the second communication apparatus according to the fourth aspect.

BRIEF DESCRIPTION OF DRAWINGS

The following describes some accompanying drawings in embodiments of this application.

DETAILED DESCRIPTION

Embodiments of this application provide a wireless communication method and an apparatus, to implement random access when data sending takes long time, reduce a probability of failed random access, and improve communication efficiency.

The following describes embodiments of this application with reference to the accompanying drawings in embodiments of this application.

In this application, "/" represents "or." The term "and/or" describes only an association relationship for describing associated objects and represents that three relationships may exist. For example, A and/or B may represent the following three cases: Only A exists, both A and B exist, and only B exists. In the specification and claims of embodiments of this application, the terms "first", "second", and the like are used to distinguish between different objects, but are not used to describe a specific order of the objects. For example, a first communication apparatus and a second communication apparatus are used to distinguish between different communication apparatuses, and are not used to describe a specific order of target objects. The term "example" or "for example" in embodiments of this application means "used as an example, an illustration, or a description. Any embodiment or design scheme described as "example" or "for example" in embodiments of this application should not be explained as being more preferred or having more advantages than another embodiment or design scheme. In the description of embodiments of this application, unless otherwise stated, "a plurality of" means two or more than two. For example, a plurality of processing units are two or more processing units, and a plurality of systems are two or more systems.

The technical solutions of this application may be applied to a non-terrestrial network (NTN) system such as an unmanned aerial vehicle, a satellite communication system, and high altitude platform station (HAPS) communication. The satellite communication system is used as an example. The satellite communication system may be integrated into an existing mobile communication system, for example, a fourth generation (4G) communication system such as a long term evolution (LTE) system, a fifth generation (5G) communication system such as a new radio (NR) system, and another future mobile communication system.

Figure 1A:
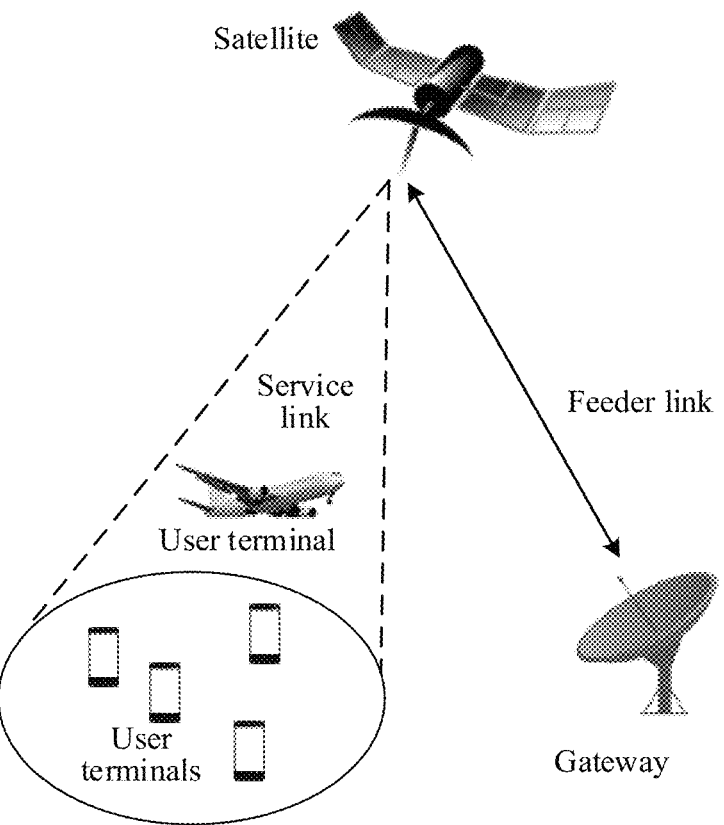
FIG. 1A is a schematic diagram of a communication system to which an embodiment of this application is applicable.

FIG. 1A is an example of a communication system to which an embodiment of this application is applicable. As shown in FIG. 1A, a satellite and a gateway (gateway) are network devices, and are configured to provide a communication service for a terminal. The gateway may also be referred to as a gateway station. A link between the satellite and the terminal is referred to as a service link (service link), and a link between the satellite and the gateway is a feeder link (feeder link).

When the satellite works in transparent (transparent) mode, the satellite has a relay and forwarding function. The gateway has functions of a base station or some functions of a base station. Optionally, the gateway may be considered as a ground base station. Alternatively, the ground base station and the gateway may be deployed separately. In this case, a delay of the feeder link includes a delay from the satellite to the gateway and a delay from the gateway to the ground base station. The transparent mode in embodiments of this application is described by using an example in which the gateway and the ground base station are disposed together or are located close to each other. When the gateway is far away from the ground base station, the delay of the feeder link is a sum of a delay from the satellite to the gateway and a delay from the gateway to the base station.

When the satellite works in regenerative (regenerative) mode, the satellite has a data processing capability, and functions of a base station or some functions of a base station, and the satellite may be considered as a base station.

The satellite may work in staring mode or non-staring mode. In the staring mode, as the satellite moves, coverage of the satellite for the ground does not change. That is, coverage of satellite signals does not move with the satellite in a period of time. In the non-staring mode, coverage of satellite signals for the ground moves with the satellite, which may also be understood as that an angle at which the satellite transmits signals to the ground does not change.

The satellite described in embodiments of this application may be a satellite base station, or a network side device mounted on the satellite.

The satellite base station, the gateway, or the ground base station may be an evolved NodeB (evolved NodeB, eNB, or eNodeB) in LTE, or a base station in a 5G network, a broadband network service gateway (broadband network gateway, BNG), an aggregation switch, a non-third generation partnership project (3GPP) access device, or the like. This is not specifically limited in embodiments of this application. Optionally, the base station in embodiments of this application may include base stations in various forms, for example, a macro base station, a micro base station (also referred to as a small cell), a relay station, an access point, a next-generation NodeB (gNodeB, gNB), a transmission and receiving point (transmitting and receiving point, TRP), a transmitting point (transmitting point, TP), a mobile switching center, and a device that functions as a base station in device-to-device (D2D), vehicle-to-everything (V2X), machine-to-machine (M2M) communication, or internet of things (Internet of Things) communication. This is not specifically limited in embodiments of this application.

The satellite base station, the gateway, or the ground base station may perform communication interaction with a core network device, and provide a communication service for a terminal device. The core network device is, for example, a device in a core network (CN) of a 5G network. As a bearer network, the core network provides an interface to a data network, provides communication connection, authentication, management, and policy control for user equipment (UE), bears data services, and the like. The CN may further include network elements such as an access and mobility management function (AMF) network element, a session management function (SMF) network element, an authentication server function (AUSF) network element, a policy control function (PCF) network element, and a user plane function (UPF) network element.

The terminal described in embodiments of this application may be an internet of things terminal, and may be specifically user equipment (UE), an access terminal, a subscriber unit (subscriber unit), a subscriber station, a mobile station (mobile station), a remote station, a remote terminal, a mobile device, terminal equipment (terminal equipment), a wireless communication device, a user agent, or a user apparatus. The terminal device may also be a satellite phone, a cellular phone, a smartphone, a wireless data card, a wireless modem, a machine-type communication device, a cordless phone, a session initiation protocol (SIP) phone, a wireless local loop (WLL) station, a personal digital assistant (PDA), a handheld device having a wireless communication capability, a computing device or another processing device connected to a wireless modem, a vehicle-mounted device, a communication device on a high-altitude aircraft, a wearable device, a virtual reality (VR) terminal device, an augmented reality (AR) terminal device, a wireless terminal in industrial control (industrial control), a wireless terminal in self driving (self driving), a wireless terminal in remote medical (remote medical), a wireless terminal in smart grid (smart grid), a wireless terminal in transportation security (transportation safety), a wireless terminal in smart city (smart city), a wireless terminal in smart home (smart home), or a terminal device in a 5G network, a 6G network, or a future communication network or the like. This is not limited in this application.

Figure 1B:
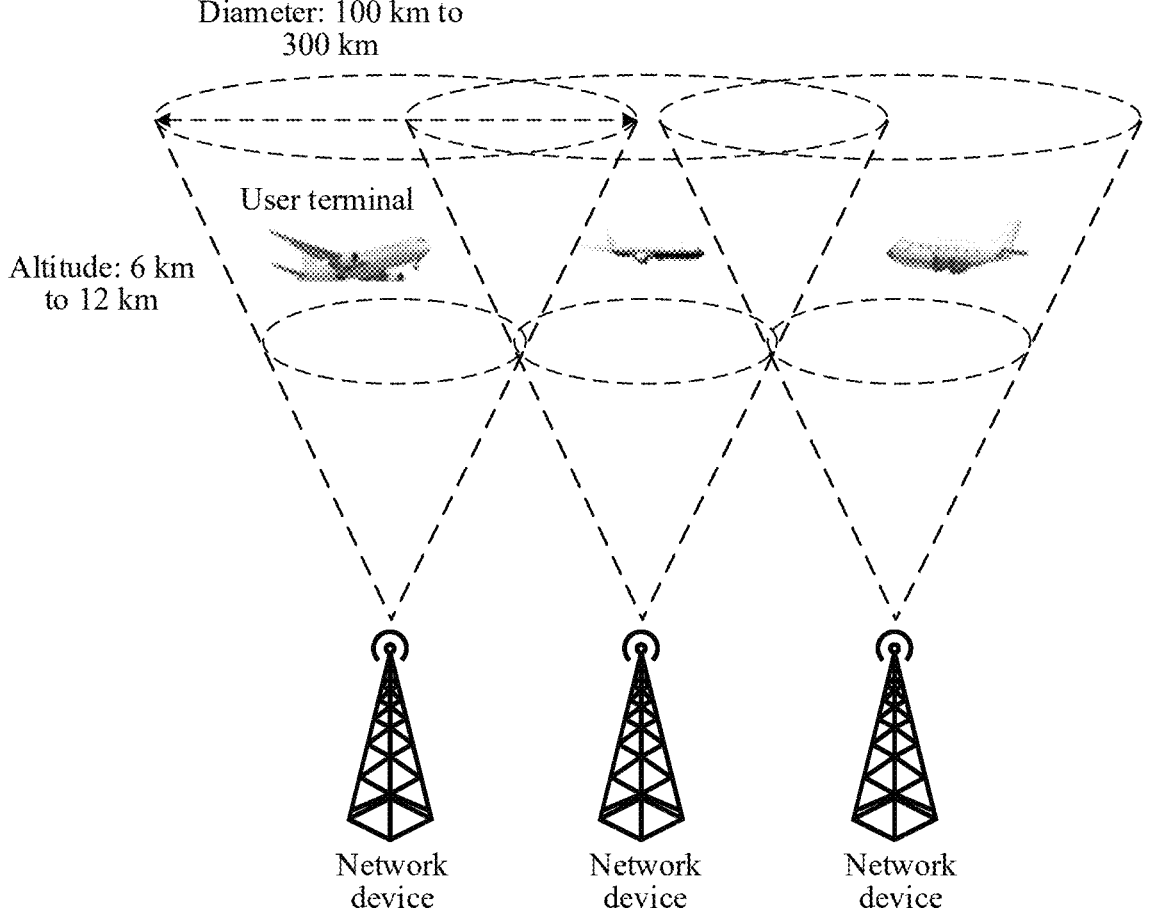
FIG. 1B is a schematic diagram of another communication system to which an embodiment of this application is applicable.

FIG. 1B is an example of another communication system to which an embodiment of this application is applicable. FIG. 1B shows an air to ground (air to ground, ATG) communication system. A network device includes a ground base station, and a user terminal includes a mobile device mounted on a high altitude aircraft. In this scenario, the network device is generally fixed, and the terminal has high-speed mobility.

Satellite communication systems can be classified into the following three types according to different orbit altitudes: a geostationary earth orbit (GEO) satellite communication system, also referred to as a geostationary orbit satellite system, a medium earth orbit (MEO) satellite communication system, and a low earth orbit (LEO) satellite communication system. Usually, a GEO satellite is also referred to as a geostationary satellite, with an orbit altitude of 35786 km, and has a main advantage that the GEO satellite is stationary relative to the ground and provides large coverage. However, the GEO satellite has the following disadvantages: If the GEO satellite is at an extremely long distance from the earth, a large-diameter antenna is required. A transmission delay is long, and is about 0.5 s, and cannot meet a requirement of a real-time service. In addition, the GEO satellite has limited orbit resources, high transmission costs, and cannot provide coverage for the polar areas. An MEO satellite has an orbit altitude of 2000 km to 35786 km, and a small quantity of MEO satellites can implement global coverage. However, the MEO satellite has a longer transmission delay than a LEO satellite and is mainly used for positioning and navigation. A satellite with an orbit altitude of 300 km to 2000 km is referred to as a low earth orbit satellite (LEO). Compared with the MEO satellite and the GEO satellite, the LEO satellite has a lower orbit altitude, a shorter data transmission delay, less power loss, and lower launch costs. Therefore, a LEO satellite communication network has made great progress in recent years and has attracted attention.

In the future, we hope to build a fully connected world. Network connections are to be extended to any place and between any objects, such as electric meters, containers, and freight. The internet of things features delay-insensitivity, massive connections, and wide coverage. The integration of the internet of things with an NTN network, especially a LEO satellite with low launch costs and a short delay is an important development direction.

In the internet of things, it is necessary to implement networked communication for objects, which requires a large quantity of internet of things devices, and requires low costs of internet of things communication devices. To reduce costs, internet of things devices use low-cost intermediate radio frequency components, and radio frequency transmit power is not high. To enhance coverage, a repeated transmission method is usually used. The internet of things device may also be referred to as a low-cost terminal or an internet of things terminal in the following.

Similarly, even for a high-cost device, to enlarge coverage, a method of repeatedly sending data may be used to improve decoding performance of a receive end. For example, channel quality and a coverage condition at a location of an internet of things terminal may be very poor. To improve a coverage capability of the internet of things terminal, an uplink signal or a downlink signal needs to be repeatedly sent for a plurality of times, to improve decoding performance of a receive end. In this way, the coverage capability of the internet of things terminal is improved.

An existing internet of things communication protocol supports an uplink transmission time interval (TTI) greater than 4 seconds. In addition, to enhance coverage, three different coverage levels are set and correspond to different quantities of repetitions during signal sending. For example, the coverage levels may include normal coverage, extended coverage, and extreme coverage, which respectively correspond to coverage levels 0, 1, and 2. At the extreme coverage level, data may be repeatedly sent for 128 times during signal sending. In the extended coverage, data may be repeatedly sent for 64 times. In the normal coverage, data may be repeatedly sent for 8 times. Herein, the quantity of repetitions for data sending is merely an example. In specific communication, different quantities of repetitions are selected according to specific channel measurement values.

In addition, the internet of things terminal may be installed at a location without power supply and needs to be powered by a battery. Battery replacement costs are high. In some scenarios in which battery replacement is inconvenient, a battery lifespan determines a lifespan of an internet of things terminal. Therefore, the internet of things terminal is also required to have features of low power consumption and power saving. For purposes of low costs, protocol simplification, and power saving, when the internet of things terminal enters a coverage area of a cell from a coverage area of another cell, cell handover also needs to be implemented through random access.

Based on different coverage levels and different quantities of repetitions for data sending, the internet of things terminal occupies different duration for random access to the system and subsequent data transmission. Generally, random access duration is about 5 seconds at the normal coverage level. Power consumed by the internet of things terminal in a random access phase accounts for about 15% of total power consumed in a communication procedure.

Figure 2:
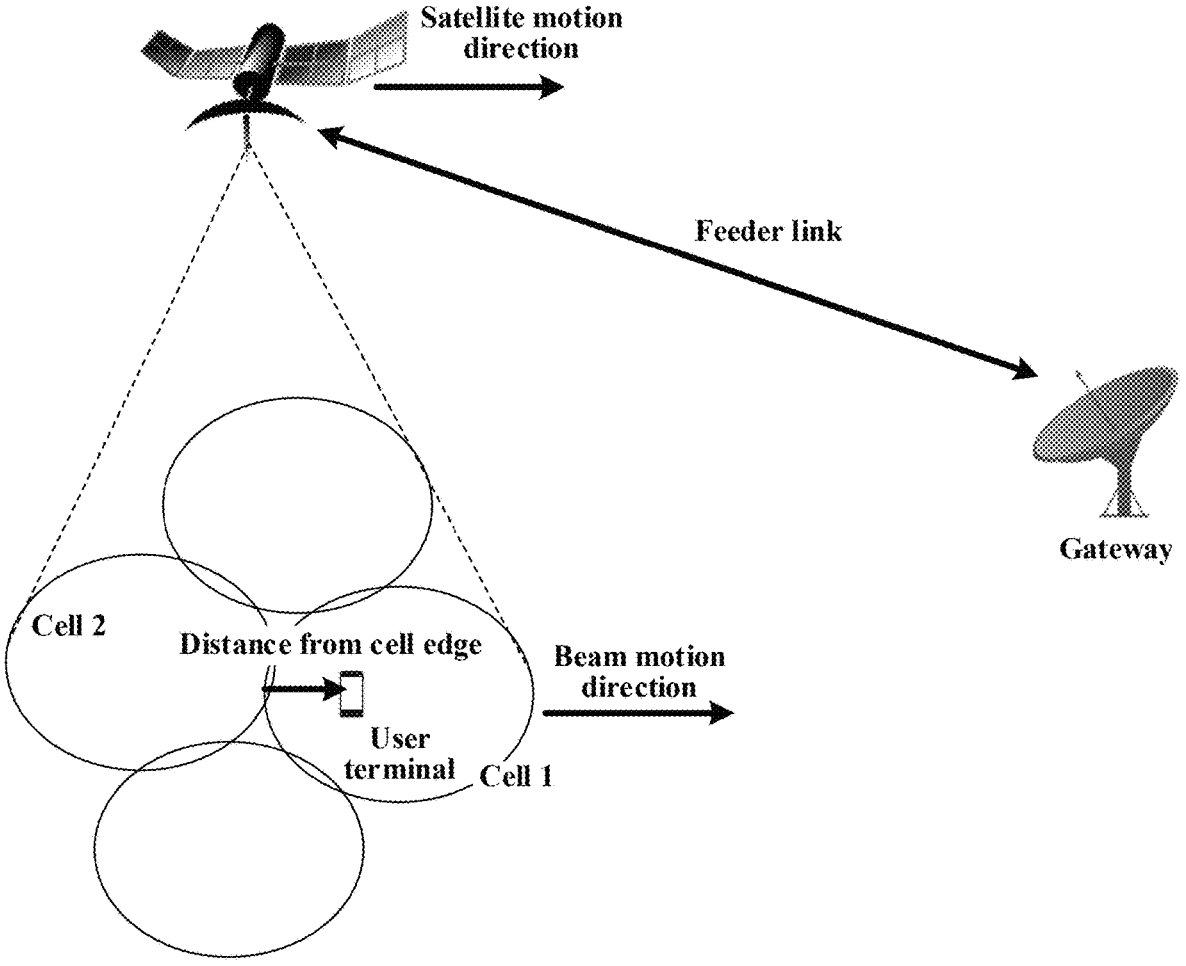
FIG. 2 is a schematic diagram of an application scenario according to an embodiment of this application.
Figure 3:
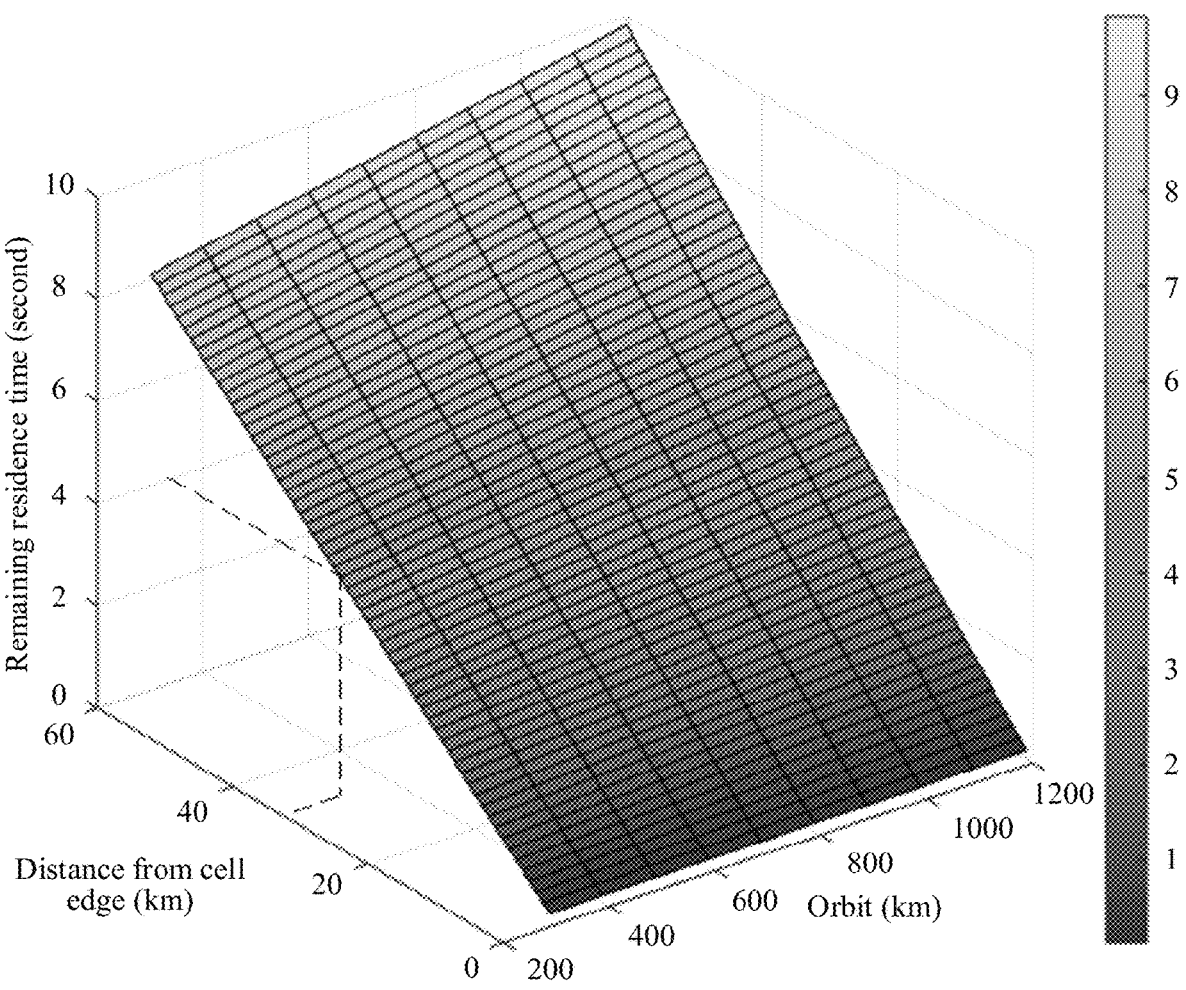
FIG. 3 is a diagram of a relationship between a circular orbit altitude, a distance from cell edge, and a length of remaining residence time.

In the LEO scenario of the NTN, a rapid movement (about 7.8 kilometers/s) of a satellite causes frequent handover between coverage of cells/beams. FIG. 2 is a schematic diagram of an application scenario according to an embodiment of this application. As a satellite moves, a cell 1 no longer covers a location of a terminal, and the terminal is handed over from the cell 1 to a cell 2. Duration in which the terminal can reside in a cell/beam or stay within coverage of the cell/beam is related to an orbit altitude and a distance from cell/beam edge. A larger distance between the terminal and an edge (for example, a left edge in FIG. 2) that is of the cell and that is opposite to a motion direction of the satellite indicates longer time in which the terminal can reside in the cell. A shorter distance between the terminal and the edge that is of the cell and that is opposite to the motion direction of the satellite indicates shorter time in which the terminal can reside in the cell. FIG. 3 is a diagram of a relationship between a circular orbit altitude, a distance from cell edge, and a length of remaining residence time. A higher orbit altitude indicates longer residence time, because a higher orbit altitude indicates a lower angular velocity of the satellite, and longer time in which the satellite sweeps over a same distance. It can be learned from FIG. 3 that, when a distance between the terminal and the cell edge is greater than 30 km, the terminal may reside in the cell for more than 4 seconds.

In conclusion, because the internet of things terminal sends data by using different coverage levels for different quantities of repetitions, duration required for system access and subsequent data sending is also different. Longest time is required at the extreme coverage level. However, due to frequent handover between NTN beams/cells, coverage time of a cell/beam for a terminal that requests to accessing the system may be short. As a result, coverage time/residence time of the cell/beam for the terminal is insufficient to complete the requesting to access the system and data transmission. The terminal needs to switch to an idle (idle) state, and re-request to access the system in another cell/beam, which causes interruption of data transmission and a waste of power.

Figure 4:
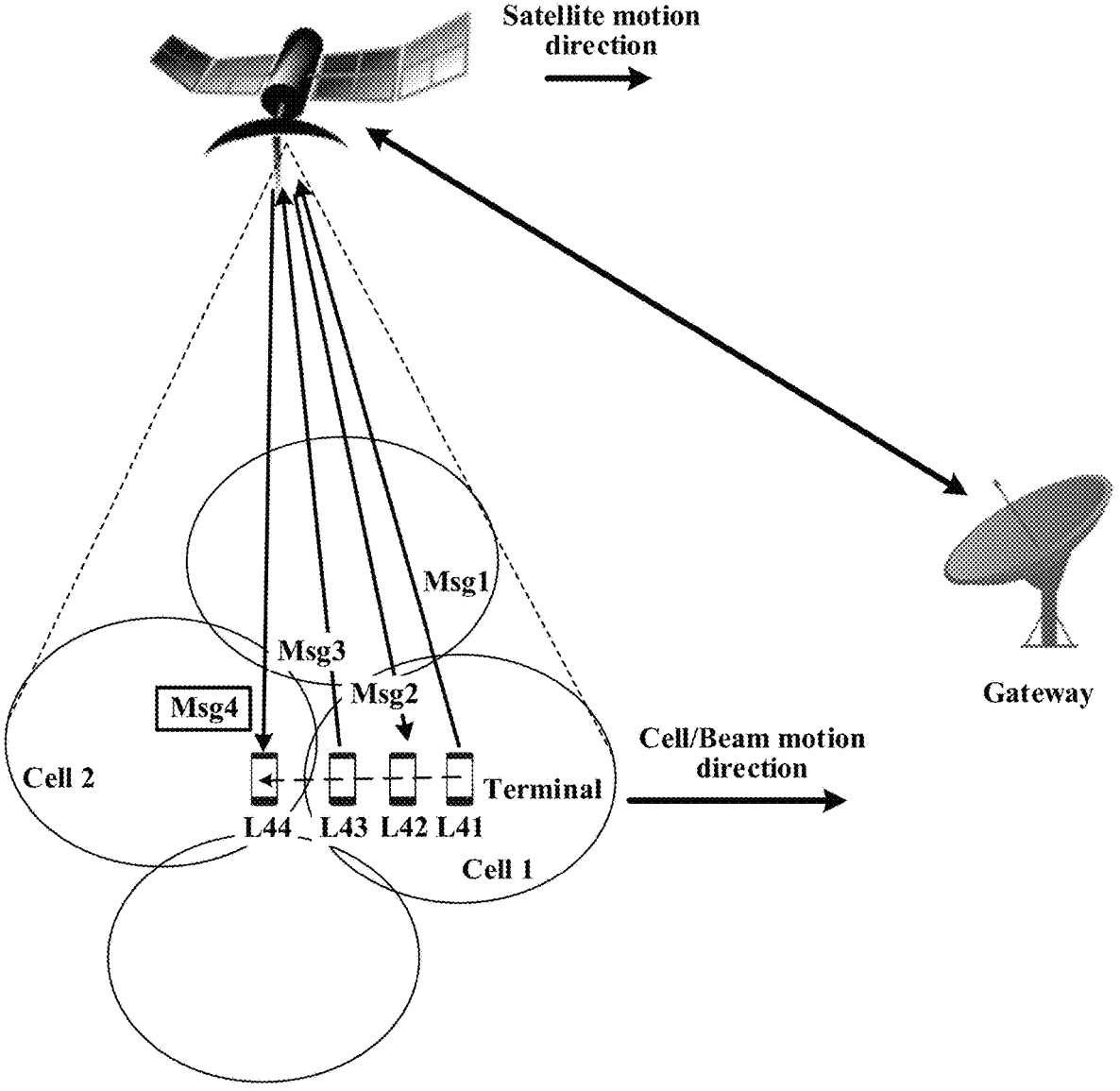
FIG. 4 is a schematic diagram of another application scenario according to an embodiment of this application.

FIG. 4 is a schematic diagram of another application scenario according to an embodiment of this application. It is assumed that a beam transmitted by a satellite to the ground is a moving beam (moving beam). When a terminal requests to access the system from a cell 1 in a manner such as random access, coverage time of the cell 1 for the terminal is insufficient to complete a random access procedure. When a cell 2 covers a location of the terminal, random access can only be requested again in the cell 2, which reduces communication efficiency and causes a waste of power. For example, remaining coverage time or residence time of the terminal within coverage of the cell 1 is 3 seconds, and a message 1 (Msg1), a message 2 (Msg2), and a message 3 (Msg3) are sent between the terminal and a network device within the 3 seconds. When the network device (satellite) needs to send a message 4 (Msg4), the terminal has entered a coverage area of the cell 2 due to movement of the satellite, and consequently cannot receive, in the cell 1, the Msg4 sent by the network device. The terminal fails in random access, and can only re-request to access the system in the cell 2. For example, if the terminal can successfully access the system from the cell 1, but does not complete sending of uplink data within the coverage time of the cell 1, after entering the cell 2, the terminal needs to continue sending the uplink data, and the terminal also needs to re-initiate random access in the cell 2.

To resolve the problem that the internet of things terminal re-accesses the system due to a large quantity of repetitions for data sending, long time occupied by random access and data transmission, and insufficient remaining coverage time of a cell during random access and subsequent data sending, and consequently communication efficiency is reduced and power is wasted, embodiments of this application provide a wireless communication method and a related communication apparatus.

A first communication apparatus in this application may be a terminal, for example, an internet of things terminal, and a second communication apparatus may be a network device, for example, a satellite base station, a gateway, or a ground base station. The following provides descriptions by using a terminal as the first communication apparatus and a network device as the second communication apparatus.

Figure 5:
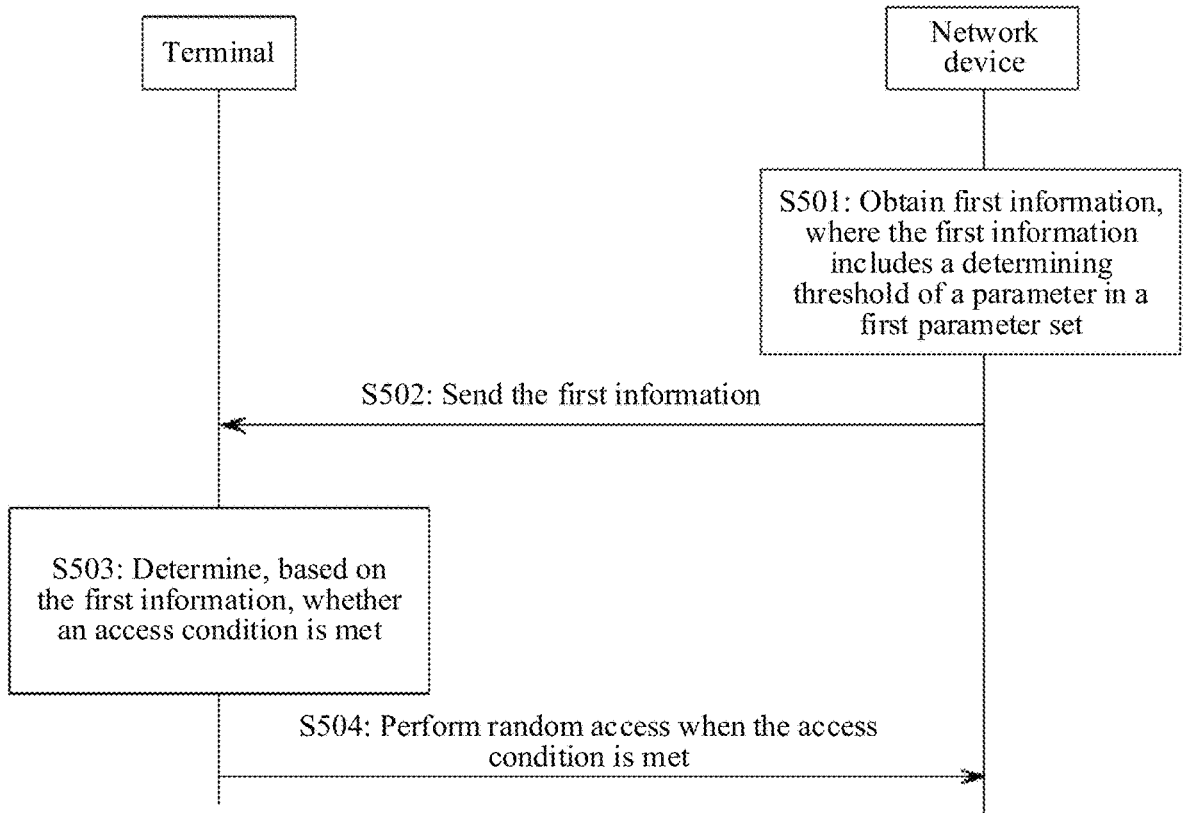
FIG. 5 is a schematic interaction diagram of a wireless communication method according to an embodiment of this application.

FIG. 5 is a schematic interaction diagram of a wireless communication method according to an embodiment of this application. In the method shown in FIG. 5, a network side indicates a determining threshold; and a terminal determines, based on the determining threshold, whether an access condition is currently met, and performs random access only when the condition is met, to avoid a random access failure in a current cell and re-access in a next cell due to random access performed when the condition is not met.

S501: The network device obtains first information, where the first information indicates a determining threshold of a parameter in a first parameter set.

The first parameter set includes at least one of the following parameters: location information, delay information, a timing advance rate, a rate of the timing advance rate, a Doppler value, a Doppler rate, and remaining coverage time.

In a possible implementation, a first parameter in the first parameter set has a plurality of determining thresholds, and there is a correspondence between the determining thresholds of the first parameter and coverage levels and/or service data volumes. The plurality of determining thresholds may include one reference threshold and at least one difference. The first parameter may be location information, delay information, a timing advance rate, a rate of the timing advance rate, a Doppler value, a Doppler rate, and/or remaining coverage time.

In a possible implementation, the determining threshold of the parameter in the first parameter set has a corresponding determining condition. Optionally, the first information further indicates the determining condition corresponding to the determining threshold of the parameter in the first parameter set. Alternatively, the determining condition is a preconfigured condition, for example, is agreed upon according to a communication protocol, so that this method can reduce signaling overheads. Alternatively, the determining condition may be determined by the terminal based on location information and/or a motion direction of a satellite (network device), so that signaling overheads can be reduced.

For example, for the determining threshold of the first parameter in the first parameter set, the determining condition may be being greater than or equal to the determining threshold, greater than the determining threshold, less than the determining threshold, less than or equal to the determining threshold, on the same side or opposite side of a satellite motion direction of a determining threshold contour line, or on the east/west or south/north of a determining threshold contour line. It should be noted that whether the determining condition includes a case of being equal to the determining threshold or a case of being on the determining threshold contour line does not affect the essence of the technical solutions of this application.

In a possible implementation, the first information includes index information, and the index information indicates a determining threshold that is of a parameter in the first parameter set and that corresponds to a cell in which the terminal is located.

Relationships between determining thresholds and determining conditions of different parameters in the first parameter set, and coverage levels and/or service data volumes are described in detail below. Details are not described herein again.

S502: The network device sends the first information, and correspondingly, the terminal receives the first information.

In a possible implementation, the network device broadcasts or multicasts the first information to the terminal. The first information may be carried in a system information block (SIB) 1, other system information (OSI), or a master information block (MIB); or may be carried in other broadcast information. Broadcasting or multicasting the foregoing information to the terminal can avoid scheduling different resources for different terminals to send the foregoing signaling, reduce signaling overheads of resource scheduling, and reduce system scheduling complexity.

In another possible implementation, in radio resource control (RRC) connection setup and subsequent communication, the first information may be carried in information such as RRC information (for example, an RRC setup (RRCSetup) message, an RRC reconfiguration (RRCReconfiguration) message, an RRC resume (RRCResume) message), downlink control information (DCI), group DCI, a media access control (MAC) control element (control element), or a timing advance command (TAC). The foregoing information is separately sent to the terminal, so that a parameter value of each terminal can be flexibly controlled, and different parameter values can be configured for the terminal based on different locations or different areas of the terminal, to optimize a system parameter and terminal communication performance/system communication performance.

In still another possible implementation, the network device may send the first information along with data transmission, or send the first information on a separately allocated physical downlink shared channel (PDSCH).

S503: The terminal determines, based on the first information, whether an access condition is met.

Specifically, determining whether the access condition is met is determining whether coverage time of a cell/beam can meet time required for completing random access and/or data communication.

In a possible implementation, the terminal obtains first comparison information based on location information of the terminal and/or location information of the network device, and determines, based on the first comparison information and the first information, whether the random access condition is met.

Specifically, the terminal may obtain the location information of the terminal based on a global navigation satellite system (GNSS). The terminal may obtain the location information of the network device based on ephemeris information. The ephemeris information may be sent by the network device to the terminal, or may be locally prestored information in the terminal. This is not limited herein.

In a possible implementation, before determining whether the access condition is met, the terminal obtains a correspondence between the determining threshold of the parameter in the first parameter set and a coverage level and/or service data volume.

The correspondence may be sent by the network device based on the first information. The correspondence may be indicated by the index information in the first information, and the terminal determines the correspondence from a preconfigured mapping relationship table based on the index information.

In a possible implementation, when the first parameter in the first parameter set has a plurality of determining thresholds, and there is a correspondence between the plurality of determining thresholds and coverage levels and/or service data volumes, the terminal obtains a coverage level and/or service data volume of the terminal, selects a corresponding determining threshold of the first parameter from the plurality of determining thresholds based on the coverage level and/or service data volume of the terminal and the correspondence, and further determines, based on the selected determining threshold of the first parameter and the first comparison information, whether the access condition is met.

Specifically, the terminal may select a to-be-used coverage level based on reference signal received power (RSRP). For example, if the terminal detects, by using downlink reference signal, that a signal to noise ratio (SNR) of a downlink is −10 dB, the terminal selects a coverage level 2. If the terminal detects that the SNR is −5 dB, the terminal selects a coverage level 1. If the terminal detects that the SNR is 2 dB, the terminal selects a coverage level 0.

The determining, based on the first comparison information and the first information, whether the access condition is met is specifically: comparing the first comparison information with the determining threshold of the parameter in the first parameter set based on a determining condition, and determining whether the access condition is met. The determining condition corresponds to the determining threshold of the parameter in the first parameter set.

Optionally, the determining condition may be indicated by using the first information, and the terminal obtains the determining condition based on the first information.

Alternatively, the determining condition is a preconfigured condition, and the terminal obtains the determining condition based on prestored configuration information or uses a default determining condition, to reduce overheads of signaling sent by the network device to the terminal.

Alternatively, the determining condition may be determined by the terminal based on location information and/or a motion direction of the satellite (network device), to reduce overheads of signaling sent by the network device to the terminal.

S504: The terminal initiates a random access request when the access condition is met.

The terminal determines the access condition in S503. When a determining result is that the access condition is met, it indicates that coverage time of a current cell/beam meets the condition and is sufficient for the terminal to perform random access and/or data transmission, and the terminal initiates random access.

In a possible implementation, when initiating random access, the terminal sends a preamble (preamble) to notify a network of the coverage level and/or service data volume of the terminal, so that the network device allocates a communication resource to the terminal. For example, the terminal notifies the network device of the coverage level and/or service data volume of the terminal by selecting a resource used for sending the preamble. Alternatively, preambles may be grouped, and the terminal notifies the network device of the coverage level and/or service data volume of the terminal by selecting preambles in different groups.

When the determining result is that the access condition is not met, it indicates that the coverage time of the current cell/beam does not meet the condition, and the terminal cannot complete random access and/or data transmission within remaining coverage time of the cell/beam. In a possible implementation, the terminal waits for a next cell/beam to perform determining, or performs random access in a next cell/beam.

Relationships between determining thresholds and determining conditions of different parameters in the first parameter set, and coverage levels and/or service data volumes are described in detail below.

(1) Location Information: A Parameter in the First Parameter Set Includes Location Information.

The terminal determines, based on the indication (first information) of the location information sent by the network side, whether the terminal can complete random access and subsequent data communication within coverage time of the cell/beam, to avoid re-requesting of random access due to interruption in a process of requesting to access to the system.

The network device determines a minimum distance between the terminal and a cell edge based on time required for the terminal to access the system, and then determines a determining threshold based on the minimum distance. Optionally, the network device may further determine the minimum distance between the terminal and the cell edge by using time required for the terminal to access the system and subsequent data communication.

In a possible implementation, the network device determines minimum distances between terminals with one or more coverage levels and/or service data volumes and the cell edge based on time required for the terminals to access the system, and determines one or more determining thresholds based on the minimum distances corresponding to the different coverage levels and/or service data volumes.

Optionally, the location information may be longitude and latitude information, for example, longitude information, latitude information, or longitude and latitude information. The determining threshold is a longitude value, a latitude value, or longitude and latitude values.

Figure 6:
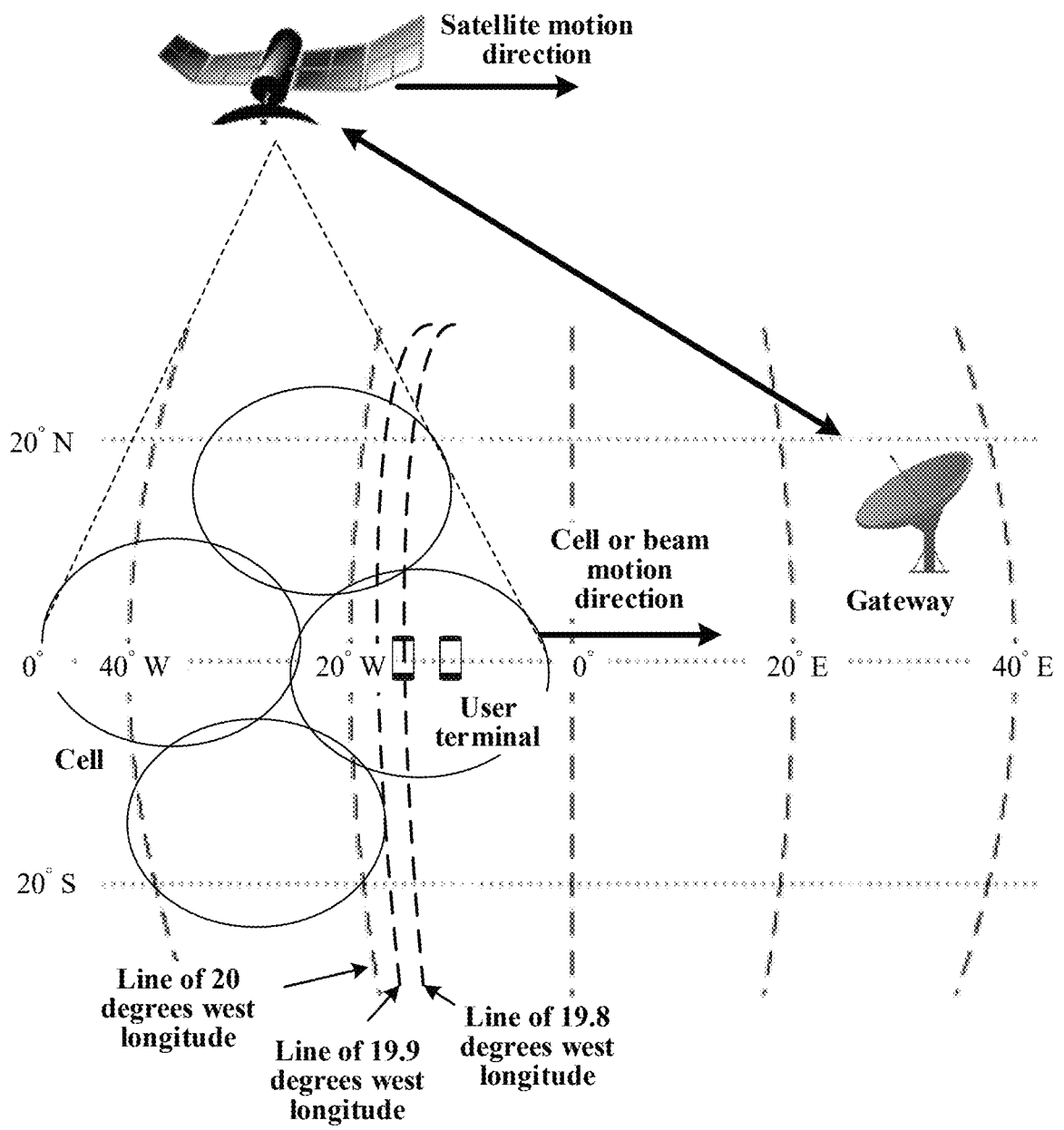
FIG. 6 is a schematic diagram of an example application scenario in which location information is used as a determining threshold according to an embodiment of this application.

FIG. 6 is a schematic diagram of an example application scenario in which location information is used as a determining threshold according to an embodiment of this application. The network device determines three longitude lines based on time required for terminals at three coverage levels to access the system. Table 1 lists a correspondence between a determining threshold, a determining condition, and a coverage level. A coverage level 0 indicates a lowest coverage level, for example, corresponds to normal coverage. A coverage level 2 indicates a highest coverage level, for example, corresponds to extreme coverage. The determining threshold is 20 degrees west longitude, 19.9 degrees west longitude, or 19.8 degrees west longitude, and the determining condition is being less than or equal to, or less than.

It may be understood that FIG. 6 and Table 1 are merely examples of determining the access condition based on the location information in this embodiment of this application, and are not intended as a limitation. For example, the determining threshold and condition may alternatively be being greater than or equal to 8 degrees east longitude, or greater than or equal to 8 degrees east longitude and less than or equal to 10 degrees north latitude.

TABLE 1

| Coverage level | 0 | 1 | 2 |
|---|---|---|---|
| Determining threshold and condition | Less than or equal to 20 degrees west longitude | Less than or equal to 19.9 degrees west longitude | Less than or equal to 19.8 degrees west longitude |

The network device sends information (first information) indicating the correspondence between a determining threshold, a determining condition, and a coverage level.

After receiving the information, the terminal determines, based on a location of the terminal as comparison information, whether the access condition is met, and initiates random access in the current cell if the access condition is met. For example, in the scenario in FIG. 6, if a location of a terminal at the coverage level 1 is 18 degrees west longitude, the terminal performs random access. If the location of the terminal at the coverage level 1 is 20 degrees west longitude, the terminal waits for a next cell and then performs determining or random access.

In a possible implementation, the determining condition may be implicitly indicated, and the terminal may determine the determining condition based on a satellite location and a satellite motion direction. Alternatively, the determining condition is preconfigured, for example, configured as being less than or equal to, greater than or equal to, greater than, or less than. Alternatively, the network device indicates the determining condition in the first information.

In a possible implementation, the network device does not send a correspondence between a determining threshold and a coverage level, and only needs to send one determining threshold, and terminals at all coverage levels use a same determining threshold for determining. For example, the network device indicates only the determining threshold corresponding to the coverage level 2 in Table 1 for use by all terminals within coverage of the cell/beam. This can reduce signaling overheads.

It should be noted that, optionally, the information sent by the network device may further indicate a condition that random access is not met, that is, a condition that random access cannot be performed. The terminal determines, based on the location of the terminal, whether the condition is met, and if the condition is met, does not perform random access. For example, in the scenario in FIG. 6, the network device sends information indicating a correspondence shown in Table 2. If a location of a terminal at the coverage level 0 is greater than 20 degrees west longitude, the terminal does not perform random access.

TABLE 2

| Coverage level | 0 | 1 | 2 |
|---|---|---|---|
| Determining threshold and condition | Greater than 20 degrees west longitude | Greater than 19.9 degrees west longitude | Greater than 19.8 degrees west longitude |

In a possible implementation, to further reduce signaling overheads, a differential method may be selected to transmit the location information. For example, the network device may send longitude and latitude information 1, longitude and latitude differential information 2, and longitude and latitude differential information 3 to the terminal, and the terminal may obtain longitude and latitude information 2 based on the longitude and latitude information 1 and the longitude and latitude differential information 2 (for example, longitude and latitude information 2=longitude and latitude information 1+longitude and latitude differential information 2), and obtain the longitude and latitude information 3 based on the longitude and latitude information 1 and the longitude and latitude differential information 3 (for example, longitude and latitude information 3=longitude and latitude information 1+longitude and latitude differential information 3). The longitude and latitude differential information may be a positive value, or may be a negative value. This is not limited in this application.

Optionally, the location information may alternatively be information about at least two location points, and the at least two location points are used to determine a location threshold line. A corresponding determining threshold is coordinates of a location point, for example, coordinates in the earth-centered earth-fixed (Earth-Centered, Earth-Fixed, ECEF). Specifically, the network device may use two location points to indicate a location threshold line that passes through the two location points and use the location threshold line as the determining threshold.

Figure 7:
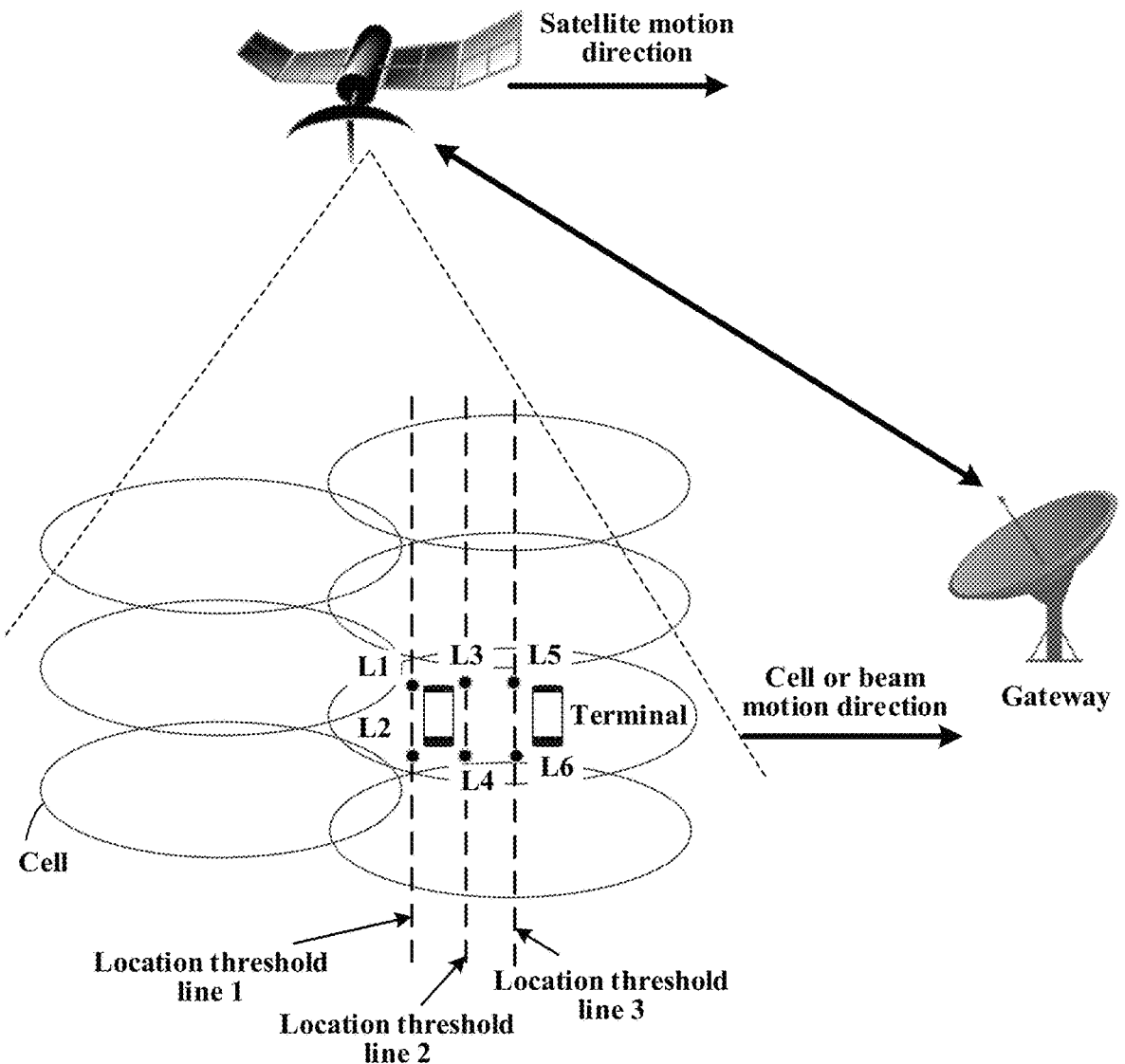
FIG. 7 is a schematic diagram of another example application scenario in which location information is used as a determining threshold according to an embodiment of this application.

FIG. 7 is a schematic diagram of another example application scenario in which location information is used as a determining threshold according to an embodiment of this application. The network device determines three location threshold lines based on time at which terminals at the three coverage levels access the system. Each location threshold line is determined by using at least two location points, and each threshold line divides a coverage area into two areas. That is, six pieces of location point information indicate three location threshold lines: A location threshold line 1 is determined based on a location point L1 and a location point L2. A location threshold line 2 is determined based on a location point L3 and a location point L4. A location threshold line 3 is determined based on a location point L5 and a location point L6.

It should be noted that one location threshold line may be further determined by three or more location points. This is not limited in this application.

For example, Table 3 lists a correspondence between a determining threshold, a determining condition, and a coverage level. At the coverage level 0, the determining threshold is the location threshold line 1, and the corresponding determining condition is being on a same side of a satellite motion direction of the location threshold line 1. At the coverage level is 1, the determining threshold is the location threshold line 2, and the corresponding determining condition is being on a same side of a satellite motion direction of the location threshold line 2. At the coverage level is 2, the determining threshold is the location threshold line 3, and the corresponding determining condition is being on a same side of a satellite motion direction of the location threshold line 3.

TABLE 3

| Coverage level | 0 | 1 | 2 |
|---|---|---|---|
| Determining threshold and condition | On the same side of the satellite motion direction of the location threshold line 1 | On the same side of the satellite motion direction of the location threshold line 2 | On the same side of the satellite motion direction of the location threshold line 3 |

The network device sends information (first information) indicating the correspondence between a determining threshold, a determining condition, and a coverage level. After receiving the information, the terminal determines, based on a location of the terminal, whether the access condition is met, and initiates random access in the current cell if the access condition is met. For example, in the scenario in FIG. 7, if a terminal at the coverage level 1 is located on the east (the right in FIG. 7, that is, the same side of the satellite motion direction) of the location threshold line, the terminal performs random access in the current cell. If a terminal at the coverage level 1 is located on the west (the left in FIG. 7) of the location threshold line, the terminal waits for a next cell and then performs determining or random access.

It should be noted that, optionally, the information sent by the network device may further indicate a condition that random access is not met, that is, a condition that random access cannot be performed. The terminal determines, based on the location of the terminal, whether the condition is met, and if the condition is met, does not perform random access. For example, in the scenario in FIG. 7, the determining condition in Table 3 is changed to be located on an opposite side of the satellite motion direction of the location threshold line. If a terminal at the coverage level 1 is located on the west (left in FIG. 7, that is, the opposite side of the satellite motion direction) of the location threshold line, the terminal waits for a next cell and then performs determining or random access.

It should be further noted that the determining condition may include a value on a location threshold line. That is, when a location of a terminal is on the location threshold line, it may be determined that the access condition is met. Alternatively, the determining condition may not include a value on a location threshold line. That is, when a location of a terminal is on the location threshold line, it may be determined that the access condition is not met.

In a possible implementation, the determining condition may be implicitly indicated, and the terminal may determine the determining condition based on a satellite location and a satellite motion direction. Alternatively, the determining condition is preconfigured. For example, the determining condition is being on a same side/opposite side of a satellite motion direction of the location threshold line, or the east/west by default. Alternatively, the network device indicates the determining condition in the first information. For example, 1 bit is used to indicate the determining condition. 0 indicates being on a same side of a satellite motion direction, and 1 indicates being on an opposite side of a satellite motion direction. Similarly, 0 may indicate being on the east of a location threshold line, and 1 may indicate being on the west of a location threshold line. Certainly, alternatively, 1 may indicate being on a same side of satellite motion direction or the east, and 0 may indicate being on an opposite side of satellite motion direction or the west. This is not limited herein.

In a possible implementation, the network device does not send a correspondence between a determining threshold and a coverage level, and only needs to send one determining threshold line, and terminals at all coverage levels use a same determining threshold line for determining. For example, the network device sends only the location threshold line 3 corresponding to the coverage level 2 in Table 3 for use by all terminals within coverage of the cell/beam.

In a possible implementation, to reduce signaling overheads, a differential method may be selected to transmit the location point information. For example, the network device may send location point information 1 (L1), location point differential information 2 ($\Delta$L2), location point differential information 3 ($\Delta$L3), location point differential information 4 ($\Delta$L4), location point differential information 5 ($\Delta$L5), and location point differential information 6 to the terminal ($\Delta$L6) to the terminal. After receiving the pieces of information, the terminal may obtain location point information 2 based on L1 and $\Delta$L2 (for example, L2=L1+$\Delta$L2), obtain location point information 2 based on L1 and $\Delta$L3 (for example, L3=L1+$\Delta$L3), obtain location point information 4 based on L1 and $\Delta$L4 (for example, L4=L1+$\Delta$L4), obtain location point information 5 (for example, L2=L1+$\Delta$L5)

based on L1 and ΔL5, and obtain location point information 6 based on L1 and ΔL6 (for example, L6=L1+ΔL6). The location point differential information may be a positive value, or may be a negative value. This is not limited in this application.

When locations of location points are in an arithmetic progression or meet another regular relationship, the network device may send only one reference value and one difference. After receiving the reference value and the difference, the terminal obtains the locations of the location points based on the reference value and the difference. For example, the network device sends the location point information 1 (L1) and a step (ΔL), and the terminal separately obtains the location point information 2, 3, 4, 5, and 6 based on L1 and ΔL after receiving L1 and ΔL. For example, L2=L1+ΔL, L3=L1+2*ΔL, L4=L1+3*ΔL, L5=L1+4*ΔL, and L6=L1+5*ΔL.

It may be understood that FIG. 7 and Table 3 are merely examples of determining the access condition based on the location information in this embodiment of this application, and are not intended as a limitation. For example, according to different satellite motion directions, the determining condition may alternatively be that the terminal is located on the south or north of a location threshold line, and may also be indicated by using 1 bit. For example, 0 indicates being on the south of the location threshold line, and 1 indicates being on the north of the location threshold line.

(2) Delay Information: A Parameter in the First Parameter Set Includes the Delay Information.

The terminal determines, based on the indication (first information) of the delay information sent by the network side, whether the terminal can complete random access and subsequent data communication within coverage time of the cell/beam, to avoid re-requesting of random access due to interruption in a process of requesting to access to the system.

The delay information indicates information about a delay between a satellite (network device) and a reference point, and may be specifically a one-way delay or a round-trip delay between the satellite and the reference point. The following uses a one-way delay as an example for description. A first reference line (also referred to as a delay contour line) may be determined based on the delay information in a cell/beam in which the terminal is located. One-way delays or round-trip delays between reference points on the first reference line and the satellite are equal, and are specifically equal to first delay information. The first reference line separates the cell/beam into two areas.

The network device determines a minimum distance between the terminal and a cell edge based on time required for the terminal to access the system, and then determines a determining threshold based on the minimum distance. The determining threshold may be the first reference line. The network device further determines delay information of the first reference line, and indicates, to the terminal, the delay information corresponding to the first reference line. Optionally, the network device may further determine the minimum distance between the terminal and the cell edge by using time required for the terminal to access the system and subsequent data communication.

Figure 8:
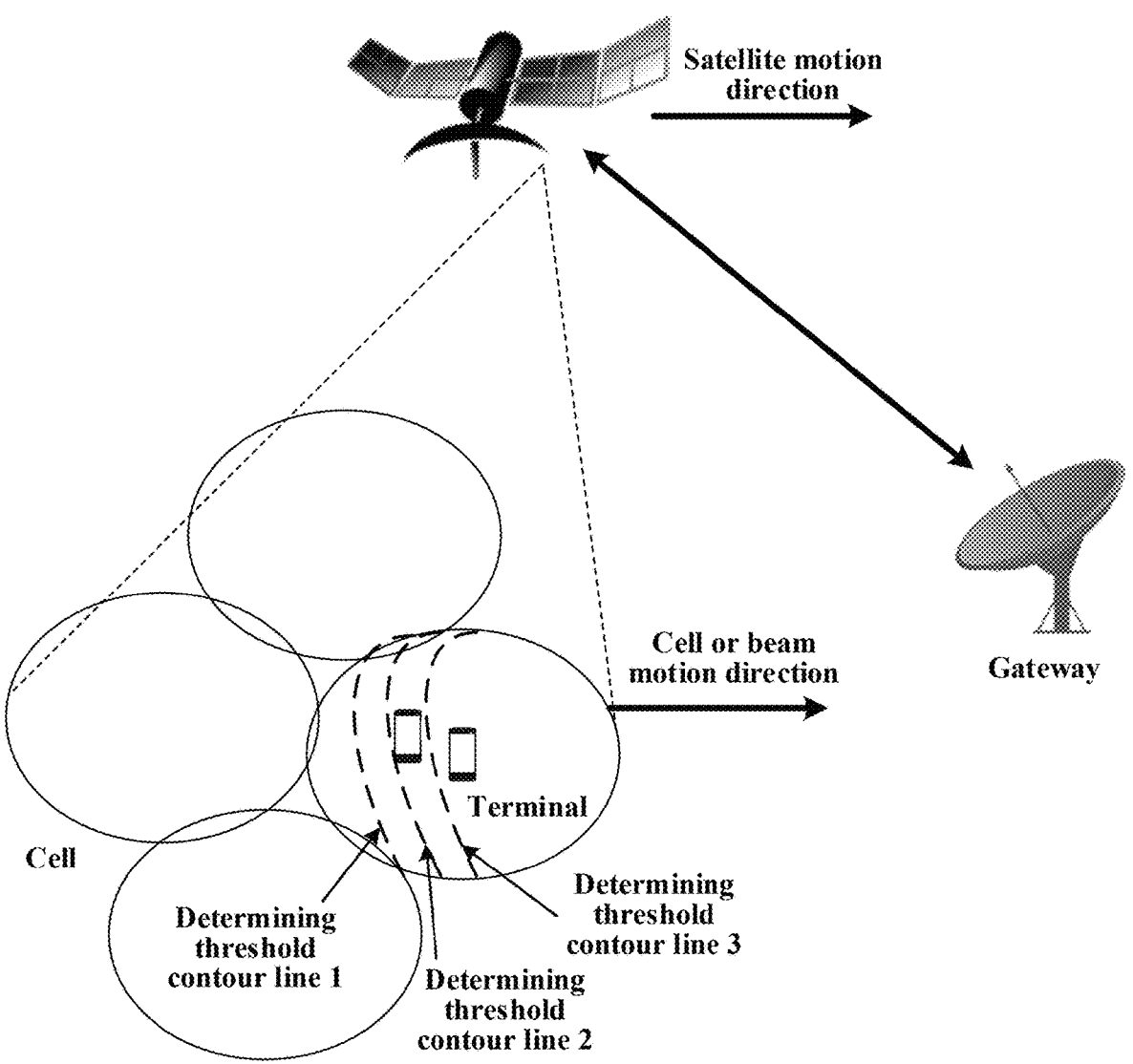
FIG. 8 is a schematic diagram of an example application scenario of a determining threshold contour line according to an embodiment of this application.

FIG. 8 is a schematic diagram of an example application scenario of a determining threshold contour line according to an embodiment of this application. The network device determines three determining threshold contour lines, namely, three delay values, based on time required for terminals at the three coverage levels to access the system. For the delay information, the determining threshold contour line may be referred to as a first reference line or a delay contour line. Each determining threshold contour line divides a coverage area into two areas.

A LEO satellite with an orbit altitude of 1200 km is used as an example, and a correspondence between a determining threshold, a determining condition, and a coverage level is shown in Table 4. The coverage level 0 corresponds to a determining threshold contour line 1, that is, 7 ms. The coverage level 1 corresponds to a determining threshold contour line 2, that is, 6.8 ms. The coverage level 2 corresponds to a determining threshold contour line 3, that is, 6.6 ms. For example, the coverage level 0 corresponds to normal coverage, the coverage level 1 corresponds to extended coverage, and the coverage level 2 corresponds to extreme coverage.

It may be understood that FIG. 8 and Table 4 are merely examples of determining the access condition based on the delay information in this embodiment of this application, and are not intended as a limitation.

TABLE 4

| Coverage level | 0 | 1 | 2 |
|---|---|---|---|
| Determining threshold and condition | Less than or equal to 7 ms | Less than or equal to 6.8 ms | Less than or equal to 6.6 ms |

The network device sends information (first information) indicating the correspondence between a determining threshold, a determining condition, and a coverage level. After receiving the information, the terminal determines a corresponding determining threshold and a corresponding determining condition based on a coverage level used by the terminal, and then determines a one-way delay or a round-trip delay between the terminal and the satellite as comparison information based on location information of the terminal and satellite location information, to determine whether the access condition is met. If the access condition is met, the terminal initiates random access in the current cell. For example, in the scenario in FIG. 8, the terminal uses the coverage level 0, and the determining threshold and condition used by the terminal are: being less than or equal to 7 ms. The terminal obtains a location of the terminal according to a technology such as GNSS, obtains a location of the network device based on ephemeris information, and then calculates a one-way delay based on the location of the terminal and the location of the network device as comparison information for determining. If the calculated one-way delay is 6.88 ms and is less than or equal to 7 ms, the terminal performs random access in the current cell. If the calculated one-way delay is 7.2 ms and is not less than or equal to 7 ms, the terminal waits for a next cell and then performs determining or random access.

Alternatively, the determining threshold and condition indicated in Table 4 may be being on a same side of a satellite motion direction of a delay contour line. That is, if the terminal is on the same side of the satellite motion direction separated by the delay contour line, it indicates that the access condition is met. If the terminal is on an opposite side of the satellite motion direction separated by the delay contour line, it indicates that the access condition is not met. Alternatively, the determining threshold and condition may be being on an opposite side of the satellite motion direction of the delay contour line. That is, if the terminal is on the opposite side of the satellite motion direction separated by the delay contour line, it indicates that the access condition is met. If the terminal is on a same side of the satellite motion direction separated by the delay contour line, it indicates that the access condition is not met. The delay contour line is represented by a delay value on the first reference line. It should be noted that, when the terminal is located at a location on the delay threshold line, it may be determined that the access condition is met. When the terminal is located at a location on the delay threshold line, it may be alternatively determined that the access condition is met. This is determined according to an actual situation.

In a possible implementation, the determining condition may be implicitly indicated, and the terminal may determine the determining condition based on a satellite location and a satellite motion direction. For example, the terminal determines, based on ephemeris information of the satellite or location and speed information of the satellite and the location information of the terminal, whether the satellite is far away from the terminal or close to the terminal. It is assumed that the satellite is far away from the terminal, that is, the satellite and the terminal move backward. When the comparison information is less than the delay information (determining threshold), the terminal may choose to access the system from the cell/beam. Otherwise, the terminal may not access the system from the cell/beam. It is assumed that the satellite is close to the terminal, that is, the satellite and the terminal move toward each other. When the comparison information is greater than the delay information (determining threshold), the terminal may choose to access the system from the cell/beam. Otherwise, the terminal may not access the system from the cell/beam. Such implicit indication can reduce signaling overheads.

In another possible implementation, a determining condition may be preconfigured, for example, is configured as being less than or equal to, greater than or equal to, greater than, or less than by default by using a communication protocol. Alternatively, the network device indicates the determining condition in the first information.

In actual use, a determining condition between the comparison information and the determining threshold under different conditions may be agreed according to a specific situation.

In a possible implementation, the network device does not send a correspondence between a determining threshold and a coverage level, and only needs to send one determining threshold, and terminals at all coverage levels use a same determining threshold for determining. For example, the network device indicates only the delay value corresponding to the coverage level 2 in Table 1 for use by all terminals within coverage of the cell/beam. This method can reduce signaling overheads.

In a possible implementation, to reduce signaling overheads, a differential method may be selected to transmit the delay information. For example, the network device may send delay information 1 (t1), delay differential information 2 ($\Delta$t2), and delay differential information 3 ($\Delta$t3) to the terminal, and the terminal may obtain delay information 2 (t2) based on t1 and $\Delta$t2 (for example, t2=t1+$\Delta$t2), and obtain delay information 3 (t3) (for example, t3=t1+$\Delta$t3) based on t1 and $\Delta$t3. The delay differential information may be a positive value, or may be a negative value. This is not limited in this application.

When delay values are in an arithmetic progression or meet another regular relationship, the network device may send only one reference value and one difference. After receiving the reference value and the difference, the terminal obtains the locations of the location points based on the reference value and the difference. For example, the network device sends the delay information 1 (t1) and one delay difference ($\Delta$t), and the terminal separately obtains the delay information 2 and 3 based on t1 and $\Delta$t after receiving t1 and $\Delta$t. For example, t2=t1+$\Delta$t, and t3=t1+2*$\Delta$t.

(3) Timing Advance Rate, Rate of the Timing Advance Rate, Doppler Value, or Doppler Rate:

The first parameter set may further include parameters such as a timing advance (Timing Advance, TA) rate (TA rate), a rate of the timing advance rate (TA rate), a Doppler (Doppler) value, or a Doppler rate (Doppler rate).

The timing advance rate indicates a change rate of a timing advance used by the terminal, and the timing advance may be a timing advance used by the terminal to send uplink data. The timing advance rate is related to a satellite motion speed, a satellite motion direction, a satellite location, a UE location, or a coverage area location. In other words, the foregoing parameter determines the timing advance rate.

The rate of the timing advance rate indicates a rate of the timing advance rate.

The Doppler value indicates a frequency offset generated when the terminal receives satellite signals due to satellite motion. In other words, a frequency offset value generated due to motion of a satellite when the terminal receives a signal sent by the satellite is referred to as a Doppler value. For example, the Doppler value may be obtained based on a location of the terminal, a location of the satellite, and a relative speed between the terminal and the satellite.

The Doppler rate indicates a rate of the Doppler value. The Doppler rate is related to a satellite motion speed, a satellite motion direction, a satellite location, a UE location, or a coverage area location. In other words, the foregoing parameter determines the Doppler rate.

Similar to the delay information, the network device determines a minimum distance between the terminal and a cell edge based on time required for the terminal to access the system, and then determines a determining threshold based on the minimum distance. The determining threshold may be a determining threshold contour line. Further, the network device determines a TA rate value, a rate value of the TA rate, a Doppler value, or a Doppler rate value of the determining threshold contour line, and indicates, to the terminal, the TA rate value, the rate value of the TA rate, the Doppler value, or the Doppler rate value corresponding to the determining threshold contour line. Optionally, the network device may further determine the minimum distance between the terminal and the cell edge by using time required for the terminal to access the system and subsequent data communication.

A determining threshold contour line corresponding to the TA rate may be referred to as a TA rate value contour line or a second reference line. A determining threshold contour line corresponding to the Doppler value may be referred to as a Doppler value contour line or a third reference line. A determining threshold contour line corresponding to the rate of the TA rate may be referred to as a contour line of the rate of the TA rate or a fourth reference line. A determining threshold contour line corresponding to the Doppler rate may be referred to as a Doppler rate value contour line or a fifth reference line.

The network device may determine different determining threshold contour lines for terminals at different coverage levels to access the system. For example, as shown in FIG. 8, the network device determines three determining threshold contour lines based on time required for terminals at three coverage levels to access the system.

For a correspondence between a coverage level, a determining threshold, and a determining condition, and a possible implementation, refer to related descriptions in the foregoing location information or delay information. Details are not described herein again.

The network device sends information (first information) indicating the correspondence between a determining threshold, a determining condition, and a coverage level. After receiving the information, the terminal determines comparison information based on the location information of the terminal and the location information of the satellite. The details are as follows:

When the first parameter set includes the TA rate value, the TA rate may be determined based on a rate of a round-trip delay or a one-way delay between the terminal and the satellite. Specifically, the terminal may calculate the TA rate based on a location of the terminal, and a location and a speed of the satellite, and use the TA rate as the comparison information to determine whether the access condition is met. For example, when a radial velocity between the terminal and the satellite is V, TA rate=2V/c, where c represents the propagation speed of light in the air.

When the first parameter set includes the rate value of the TA rate, the terminal may calculate the rate of the TA rate based on a location of the terminal, a location of the satellite, and a speed and a direction of the satellite (location information and speed information of the satellite in a period of time are predicted based on ephemeris information), and use the rate of the TA rate value as the comparison information to determine whether the access condition is met.

When the first parameter set includes the Doppler value, the terminal may calculate the Doppler value based on a location of the terminal, a location of the satellite, and a speed of the terminal, and use the Doppler value as the comparison information to determine whether the access condition is met. For example, when a radial velocity between the terminal and the satellite is V, Doppler value=f·V/c, where f represents a carrier frequency.

When the first parameter set includes the Doppler rate value, the terminal may calculate the Doppler rate value based on a location of the terminal, a location of the satellite, and a speed and a direction of the satellite (location information and speed information of the satellite in a period of time are predicted based on ephemeris information), and use the Doppler rate value as the comparison information to determine whether the access condition is met.

(4) Remaining Coverage Time: a Parameter in the First Parameter Set Includes Remaining Coverage Time of a Cell/Beam.

When an NTN system works in staring mode, terminals in the entire cell or beam are simultaneously handed over, which means that the terminals in the entire cell or beam have same remaining coverage time or residence time in the cell or beam.

In the staring mode, the network device may indicate remaining coverage time to the terminal. The remaining coverage time indicates remaining time before handover from the cell/beam, or remaining time in which the cell/beam covers a current area, or remaining residence time. After receiving the indication information, the terminal determines, based on a coverage level and/or service data volume to be used by the terminal, whether remaining coverage time of the cell/beam meets an access requirement of the terminal, that is, an access condition. If the access condition is met, the terminal accesses the system from the cell/beam. If the access condition is not met, optionally, when a next cell/beam covers the area, the terminal obtains remaining coverage time sent by a network device of the next cell/beam, and determines whether the condition is met and whether to access the system from the cell, or whether to initiate random access in a next cell/beam.

In a possible implementation, the network device indicates, to the terminal, a determining threshold of the remaining coverage time, so that the terminal determines whether to access the system in the cell/beam. For example, as shown in Table 5, coverage levels 0, 1, and 2 correspond to different remaining coverage time. The terminal selects a corresponding determining threshold of the remaining coverage time based on the coverage level used by the terminal, and determines, based on the received remaining coverage time, whether a condition is met. Specifically, the terminal determines whether the remaining coverage time is greater than or equal to the determining threshold, or determines whether the remaining coverage time is greater than the determining threshold. If the condition is met, the terminal may request to access the system from the cell/beam. For example, when the remaining coverage time obtained by the terminal is 7 seconds, and the coverage level to be used by the terminal is 0, and the remaining coverage time is greater than the determining threshold, the terminal may access the system in the current cell/beam. If the coverage level to be used by the terminal is 1 or 2, the terminal waits for a next cell/beam and then performs determining or initiates random access.

TABLE 5

| Coverage level | 0 | 1 | 2 |
|---|---|---|---|
| Determining threshold | 5s | 8s | 10s |

Optionally, to further reduce signaling overheads, a differential method may be selected to transmit the determining threshold of the remaining coverage time. For the differential transmission method, refer to the differential transmission of other parameters such as the longitude and latitude information, the location point information, and the delay information. Details are not described herein again.

In a possible implementation, the network device may broadcast, in a unit of second, the remaining coverage time in which the beam/cell covers the area. For example, when the remaining coverage time is 5 seconds, the network device may broadcast a parameter x=5 in a unit of second. Optionally, a time unit indicating the remaining coverage time may be 1 ms, 10 ms, 500 ms, one slot length, one subframe length, one frame length, or the like. For example, if the unit is 500 ms, a parameter y=10 may be broadcast to indicate that the remaining coverage time is 5 seconds. When a larger time unit is used to indicate a same time length range, a signaling bit length can be reduced, and signaling overheads can be reduced. A time length with higher accuracy may be indicated to the terminal by using a smaller time unit, so that the terminal determines whether to access the system from the cell or beam, and a more accurate indication may be provided for the terminal.

Optionally, when a correspondence between a coverage level and a determining threshold is indicated, different time units may be used for different coverage levels. For example, a 250 ms time unit is used for the level 0, a 500 ms time unit is used for the level 1, and a 1 second time unit is used for the level 2. At a high coverage level (channel quality is poor), the terminal and the network device repeatedly send signals for a large quantity of times, signal sending occupies long duration, and long coverage time is required. In this case, a low indication accuracy of remaining coverage time may be required, and a large time unit may be used. In this way, signaling overheads for sending remaining coverage time corresponding to different coverage levels can be reduced.

The foregoing provides examples of correspondences between different determining thresholds and coverage levels, and the network device may alternatively indicate a correspondence between a determining threshold and a service data volume. The service data volume may also be used as a condition for the terminal to determine whether a system access condition is met. For example, as shown in Table 6, the service data volume is quantitatively indicated by using low, medium, and high, and a mapping relationship between a determining threshold and a condition is established. The terminal selects a corresponding determining threshold and a condition for comparison based on the service data volume of the terminal.

Alternatively, a range of a service data volume may be quantitatively indicated. For example, data in less than 5 slots (slot) is used to indicate a low service data volume (that is, less than 5 slots are required to send data). Data in more than or equal to 5 slots and less than 10 slots is used to indicate a medium service data volume (that is, 5 to 10 slots are required to send data). Data in more than or equal to 10 slots is used to indicate a high service data volume (that is, more than 10 slots are required to send data).

It should be noted that, in the foregoing example, when the service data volume is equal to 5 slots, it may alternatively indicate a low service data volume, and when the service data volume is equal to 10 slots, it may alternatively indicate a medium service data volume. The determining condition "less than or equal to" in Table 6 and Table 7 may alternatively be less than.

TABLE 6

| Service data volume | Low | Medium | High |
|---|---|---|---|
| Determining threshold and condition | Less than or equal to 7 ms | Less than or equal to 6.8 ms | Less than or equal to 6.6 ms |

As shown in Table 7, the network device may further indicate a correspondence between a determining threshold, a coverage level, and a service data volume. The terminal selects a corresponding determining threshold and condition based on the service data volume and the coverage level of the terminal.

TABLE 7

| | Coverage level | | | | | | | | |
|---|---|---|---|---|---|---|---|---|---|
| | 0 | | | 1 | | | 2 | | |
| | Service data volume | | | | | | | | |
| | Low | Medium | High | Low | Medium | High | Low | Medium | High |
| Determining threshold and condition | Less than or equal to 9 ms | Less than or equal to 8.5 ms | Less than or equal to 8 ms | Less than or equal to 7.5 ms | Less than or equal to 7 ms | Less than or equal to 6.5 ms | Less than or equal to 6 ms | Less than or equal to 5.5 ms | Less than or equal to 5 ms |

It should be noted that, in Table 6 and Table 7, delay information is used as an example to describe the correspondence between a determining threshold, a service data volume, and a coverage level. The foregoing determining thresholds and conditions for parameters such as the location information, the TA rate, and the Doppler value may also have the foregoing correspondence. Details are not described herein again.

In still another possible embodiment provided in this application, considering that a satellite orbit is fixed and a cell topology relationship of each satellite is fixed, a location relationship between a cell/beam and a satellite may be associated with a determining threshold and a coverage level.

The network device and the terminal device may preconfigure a mapping relationship table, to indicate a relationship between a cell/beam and a determining threshold and a coverage level. The preconfigured table may be agreed according to a protocol, or may be sent by the network device to the terminal through broadcast or unicast transmission.

Table 8 is an example of the mapping relationship table. Determining thresholds and conditions corresponding to different coverage levels are defined for different index numbers. T1, T2, and the like indicate determining thresholds of the longitude and latitude value, the delay value, the TA rate value, and the like. Similar to the foregoing, the determining conditions may be implicitly expressed, preconfigured, or agreed according to a standard, and details are not described herein again.

It should be understood that a dimension of a service data volume may be further added to the mapping relationship table to indicate a correspondence. For example, reference may be made to Table 7, and details are not described herein again.

The network device only needs to indicate an index number to the terminal based on coverage of a cell in which the terminal is currently located, and the terminal selects a determining threshold and condition of a corresponding row based on the index number. This method can reduce indication signaling overheads. In a possible implementation, to further reduce signaling overheads, the terminal may determine the index number based on an identifier of the cell in which the terminal is located. For example, it may be agreed that, or the network device configures a cell number and an index number to meet the following condition: index number=cell number mod N, which indicates that the index number is obtained by taking a remainder of cell number/N, where N is an integer greater than 1. A value of N may be determined according to an actual situation, and is not limited herein.

It should be noted that the coverage of the cell in which the terminal is currently located means that a corresponding cell signal can be received at a location of the terminal, that is, the terminal is in the coverage of the corresponding cell. When the terminal can receive signals (for example, broadcast signals) of a plurality of cells at the same time, each cell only needs to send an index number corresponding to the cell.

TABLE 8

| Coverage level | | 0 | 1 | 2 |
|---|---|---|---|---|
| Determining threshold and condition | Index number 0 | Less than or equal to T1 | Less than or equal to T2 | Less than or equal to T3 |
| | Index number 1 | Less than or equal to T4 | Less than or equal to T5 | Less than or equal to T6 |
| | Index number 2 | Less than or equal to T7 | Less than or equal to T8 | Less than or equal to T9 |
| | Index number 3 | Less than or equal to T10 | Less than or equal to T11 | Less than or equal to T12 |
| | Index number 4 | Less than or equal to T13 | Less than or equal to T14 | Less than or equal to T15 |
| | . . . | . . . | . . . | . . . |

In still another embodiment provided in this application, the network device obtains and sends first information, where the first information indicates a determining threshold of the parameter in the first parameter set. Correspondingly, the terminal receives the first information. The terminal determines, based on the first information, whether an access condition is met. The terminal initiates a random access request, and the random access request indicates a determining result of the foregoing determining. When the determining result is that the access condition is met, the terminal initiates and completes random access in a current cell/beam. When a determining result is that the access condition is not met, after receiving the random access request, the network device sends, to the terminal, a communication resource of a cell/beam that the terminal is to enter, so that the terminal completes a subsequent random access process or subsequent service data transmission, to reduce a probability of failed random access. The communication resource may be timing information, frequency adjustment information, and/or a time-frequency resource for transmitting uplink and downlink data. For example, the terminal starts to request to access the system from a cell 1/beam 1, but remaining coverage time of the cell 1/beam 1 is insufficient for the terminal to complete a random access procedure or subsequent service data transmission. When determining, according to the foregoing possible implementation methods, that the remaining coverage time of the cell 1/beam 1 is insufficient for completing the random access process or subsequent service data transmission, the terminal indicates the determining result when sending a Msg1 to a network device of the cell 1/beam 1. For example, random access preambles may be grouped, and the random access preamble grouping may be indicated to the terminal. One group of random access preambles indicate that the access condition is met, and the other group of random access preambles indicate that the access condition is not met. The terminal selects, based on a result of determining whether the access condition is met, to use a corresponding random access preamble group. For another example, random access occasions may be grouped, and the random access occasion grouping may be indicated to the terminal. One group of random access occasions indicate that the access condition is met, and the other group of random access occasions indicate that the access condition is not met. The terminal selects, based on a result of determining whether the access condition is met, to use a corresponding random access occasion group. A random access occasion represents a time-frequency resource that can be used when the terminal sends a random access preamble.

In a possible implementation, the network device indicates, to the terminal by using a Msg2, related resource information for sending a Msg3 by the terminal to the network device and receiving a Msg4 by the terminal from the network device in a cell 2/beam 2, for example, timing, frequency adjustment information, and/or a time-frequency resource for transmitting uplink and downlink data. In this possible implementation, sending and receiving of the Msg3 and the Msg4 may occur in coverage of another cell 2/beam 2.

When the cell 2/beam 2 and the cell 1/beam 1 are cells/beams of a same network device (satellite), after receiving, in the cell 1/beam 1, the Msg1 sent by the terminal, the network device sends related resource information of the cell 2/beam 2 to the terminal in the Msg2. The Msg2 may be delivered through the cell 2/beam 2, or may be delivered through the cell 1/beam 1.

When the cell 2/beam 2 and the cell 1/beam 1 are cells/beams of different network devices (satellites), the network devices share related resource information for sending the Msg3 by the terminal to the network device and receiving the Msg4 by the terminal from the network device in the cell 2/beam 2. The network devices further exchange a coverage level and/or service data volume that are/is indicated by the terminal by using a preamble, and a temporary cell radio network temporary identifier TC-RNTI (temporary cell radio network temporary identifier, TC-RNTI) value corresponding to the terminal.

In another possible implementation, the terminal completes transmission of the Msg1, the Msg2, the Msg3, and the Msg4 in the cell 1/beam 1. The Msg4 sent by the network side indicates related resource information for subsequently sending uplink data and receiving downlink data by the terminal within coverage of the cell 2/beam 2, for example, timing, frequency adjustment information, and/or a time-frequency resource for transmitting the uplink and downlink data.

In still another possible implementation, the terminal accesses the system from the cell 1/beam 1, and in a subsequent data transmission process, the terminal is to access the coverage of the cell 2/beam 2. The network side of the cell 1/beam 1 may send, to the terminal by using a downlink message, related resource information for subsequently sending uplink data and receiving downlink data in the cell 2/beam 2, for example, timing, frequency adjustment information, and/or a time-frequency resource for transmitting the uplink and downlink data.

When the cell 2/beam 2 and the cell 1/beam 1 are cells/beams of different network devices (satellites), the network device corresponding to the cell 1/beam 1 obtains, from the network device corresponding to the cell 2/beam 2, the related resource information for sending the uplink data and receiving the downlink data within the coverage of the cell 2/beam 2. The network devices further exchange a coverage level and/or service data volume that are/is indicated by the terminal by using a preamble, and a temporary cell radio network temporary identifier TC-RNTI (temporary cell radio network temporary identifier, TC-RNTI) value corresponding to the terminal.

This can ensure that the terminal avoids a cell/beam handover procedure, ensure communication continuity, avoid a random access process again, and avoid a waste of power.

It should be noted that, this application is not limited to using only one of the foregoing various determining thresholds or contours. Two or more of the location-related information, the delay information, the TA rate value, the rate value of the TA rate, the Doppler value, the Doppler rate value, and the remaining coverage time may be jointly used as the determining threshold.

It should be further understood that determining thresholds corresponding to three coverage levels and/or service data volumes are defined in this specification, and more or fewer coverage levels may be defined based on an actual situation. This is not limited in this application.

A motion speed of the terminal is much lower than a speed of a satellite. Therefore, in this embodiment of this application, a motion direction and a speed of the terminal are not considered when it is determined whether coverage time of a cell/beam can meet time required for the terminal to complete random access and/or data communication. It should be understood that, when the terminal is on a high-speed moving vehicle, the terminal should consider a motion direction and a speed of the terminal when the comparison information is obtained based on the location information of the terminal and the location information of the satellite. Details are not described herein again.

In this embodiment of this application, a wireless communication method is provided. The network device indicates a determining threshold (and a determining condition) to the terminal. The terminal determines, based on the determining threshold and condition, whether to access the system, and performs random access only when the condition is met, to avoid re-access in a next cell due to a random access failure when the condition is not met. The correspondence between the coverage level and/or service data volume of the terminal and the determining threshold and condition of the parameter in the first parameter set is further defined, so that the terminal selects the determining threshold according to the actual coverage level and/or service data volume, and determines whether to access the system, thereby improving determining flexibility and accuracy.

To implement the functions in the foregoing method provided in embodiments of this application, the terminal device and the network device may include a hardware structure and/or a software module, to implement the foregoing functions in a form of the hardware structure, the software module, or a combination of the hardware structure and the software module. Whether a function in the foregoing functions is performed by using the hardware structure, the software module, or the combination of the hardware structure and the software module depends on particular applications and design constraints of the technical solutions.

Figure 9:
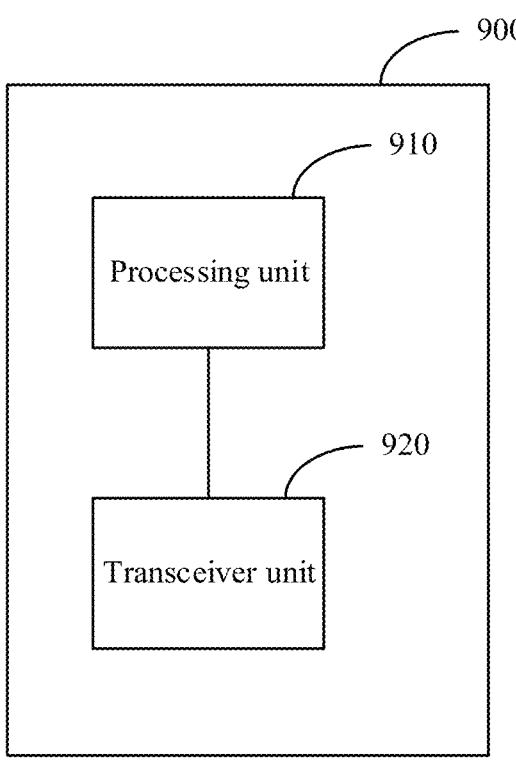
FIG. 9 is a schematic diagram of a communication apparatus according to an embodiment of this application.

As shown in FIG. 9, based on a same technical concept, an embodiment of this application further provides a communication apparatus 900. The communication apparatus 900 may be a terminal or a network device, that is, the first communication apparatus or the second communication apparatus, or may be an apparatus in a terminal device or a network device, or may be an apparatus that can be used with the terminal device or the network device. In a possible implementation, the communication apparatus 900 may include modules or units that one to one correspond to the methods/operations/steps/actions performed by the terminal in the foregoing method embodiment. The units may be hardware circuits, software, or may be implemented by a hardware circuit in combination with software. In a possible implementation, the communication apparatus 900 may include a processing unit 910 and a transceiver unit 920. The processing unit 910 may be configured to invoke the transceiver unit 920 to perform a receiving and/or sending function.

When the communication apparatus 900 is configured to perform an operation performed by a terminal, that is, a first communication apparatus, the transceiver unit 920 is configured to receive first information sent by a second communication apparatus. The first information indicates a determining threshold of a parameter in a first parameter set. The first parameter set includes at least one of the following parameters: location information, delay information, a timing advance rate, a rate of the timing advance rate, a Doppler value, a Doppler rate, and remaining coverage time. The processing unit 910 is configured to: determine, based on the first information, whether an access condition is met, and perform random access when the access condition is met.

In a possible implementation, before determining whether the access condition is met, the processing unit 910 is further configured to obtain a correspondence between the determining threshold of the parameter in the first parameter set and a coverage level and/or service data volume.

In a possible implementation, when determining, based on the first information, whether the access condition is met, the processing unit 910 is specifically configured to: obtain first comparison information based on location information of the first communication apparatus and/or location information of a second communication apparatus; and determine, based on the first comparison information and the first information, whether the access condition is met.

In a possible implementation, the processing unit 910 is further configured to: when a first parameter in the first parameter set has a plurality of determining thresholds, obtain a coverage level and/or service data volume of the communication apparatus; select a corresponding determining threshold from the plurality of determining thresholds based on the coverage level and/or service data volume of the communication apparatus; and determine, based on the first comparison information and the corresponding determining threshold of the first parameter, whether the access condition is met.

In a possible implementation, when determining, based on the first comparison information and the first information, whether the access condition is met, the processing unit 910 is specifically configured to: compare the first comparison information with the determining threshold of the first parameter based on a determining condition, and determine whether the access condition is met, where the determining condition corresponds to the determining threshold of the first parameter.

When the communication apparatus 900 is configured to perform an operation performed by a network device, that is, a second communication apparatus, the processing unit 910 is configured to obtain first information. The first information indicates a determining threshold of a parameter in a first parameter set. The first parameter set includes at least one of the following parameters: location information, delay information, a timing advance rate, a rate of the timing advance rate, a Doppler value, a Doppler rate, and remaining coverage time. The transceiver unit 920 is configured to send the first information to a first communication apparatus, so that the first communication apparatus determines, based on the first information, whether an access condition is met.

The transceiver unit 920 is further configured to perform another receiving or sending step or operation performed by the terminal or the network device in the foregoing method embodiment. The processing unit 910 may be further configured to perform corresponding steps or operations, other than receiving and sending, performed by the terminal and the network device in the foregoing method embodiment. Details are not described herein again.

Division into the modules in embodiments of this application is an example; and is merely logical function division, and may be other division during actual implementation. In addition, functional modules or units in embodiments of this application may be integrated into one processor, or each of the modules or units may exist alone physically, or two or more of the modules or units may be integrated into one module. The integrated module or unit may be implemented in a form of hardware, or may be implemented in a form of a software functional module.

Figure 10:
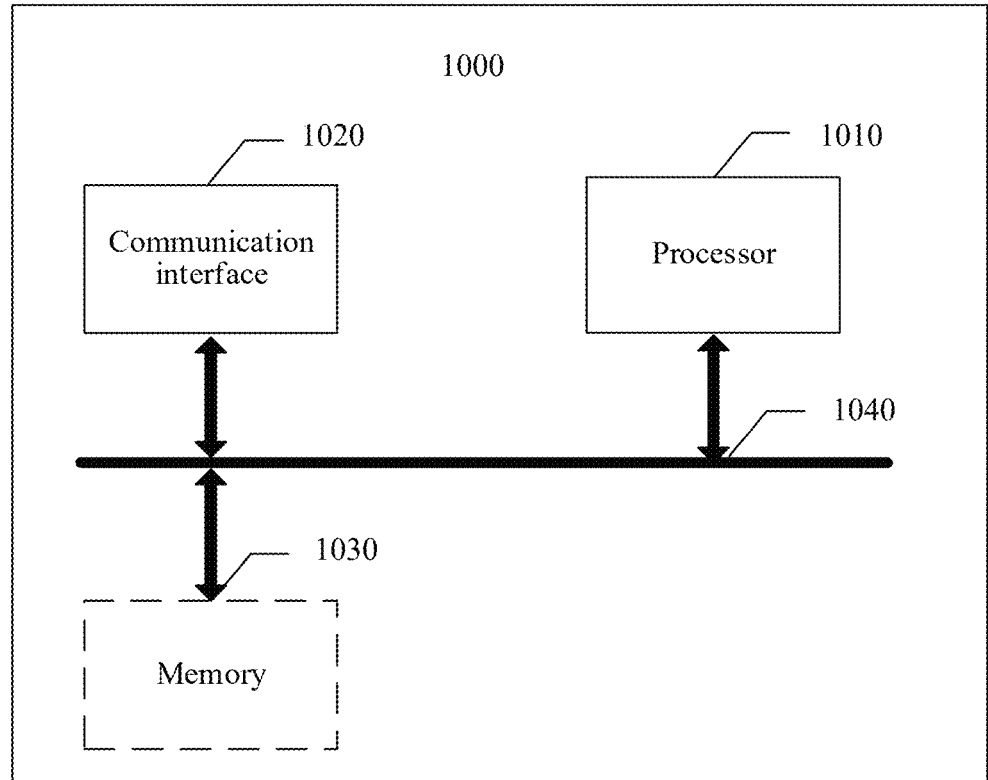
FIG. 10 is a schematic diagram of another communication apparatus according to an embodiment of this application.

Refer to FIG. 10. An embodiment of this application further provides a communication apparatus 1000, configured to implement functions of a terminal and a network device in the foregoing method, that is, functions of the first communication apparatus and the second communication apparatus. The communication apparatus may be a terminal or a network device, or may be an apparatus in a terminal or a network device, or may be an apparatus that can be used with the terminal or the network device. The communication apparatus 1000 may be a chip system. In this embodiment of this application, the chip system may include a chip, or may include a chip and another discrete component. The communication apparatus 1000 includes at least one processor 1010, configured to implement functions of the terminal and the network device in the method provided in embodiments of this application. The communication apparatus 1000 may further include a communication interface 1020. In this embodiment of this application, the communication interface may be a transceiver, a circuit, a bus, a module, or a communication interface of another type, and is configured to communicate with another device through a transmission medium. For example, the communication interface 1020 is used by an apparatus in the communication apparatus 1000 to communicate with another device.

The processor 1010 may perform functions performed by the processing unit 610 in the communication apparatus 600. The communication interface 1020 may be configured to perform functions performed by the transceiver unit 620 in the communication apparatus 600.

When the communication apparatus 1000 is configured to perform an operation performed by a terminal, the communication interface 1020 is configured to receive first information sent by a second communication apparatus. The first information indicates a determining threshold of a parameter in a first parameter set. The first parameter set includes at least one of the following parameters: location information, delay information, a timing advance rate, a rate of the timing advance rate, a Doppler value, a Doppler rate, and remaining coverage time. The processor 1010 is configured to: determine, based on the first information, whether an access condition is met, and perform random access when the access condition is met.

When the communication apparatus 1000 is configured to perform an operation performed by a network device, the processor 1010 is configured to obtain first information. The first information indicates a determining threshold of a parameter in a first parameter set. The first parameter set includes at least one of the following parameters: location information, delay information, a timing advance rate, a rate of the timing advance rate, a Doppler value, a Doppler rate, and remaining coverage time. The communication interface 1020 is configured to send the first information to a first communication apparatus, so that the first communication apparatus determines, based on the first information, whether an access condition is met.

The communication interface 1020 is further configured to perform another receiving or sending step or operation performed by the terminal or the network device in the foregoing method embodiment. The processor 1010 may be further configured to perform corresponding steps or operations, other than receiving and sending, performed by the terminal and the network device in the foregoing method embodiment. Details are not described herein again.

The communication apparatus 1000 may further include at least one memory 1030, configured to store program instructions and/or data. The memory 1030 is coupled to the processor 1010. The coupling in this embodiment of this application may be indirect coupling or a communication connection between apparatuses, units, or modules in an electrical form, a mechanical form, or another form, and is used for information exchange between the apparatuses, the units, or the modules. The processor 1020 may cooperate with the memory 1030. The processor 1010 may execute the program instructions stored in the memory 1030. In a possible implementation, at least one of the at least one memory may be integrated with the processor. In another possible implementation, the memory 1030 is located outside the communication apparatus 1000.

A specific connection medium between the communication interface 1020, the processor 1010, and the memory 1030 is not limited in this embodiment of this application. In this embodiment of this application, the memory 1030, the processor 1010, and the communication interface 1020 are connected through a bus 1040 in FIG. 10. The bus is indicated by using a bold line in FIG. 10. A connection manner between other components is merely an example for description, and is not limited thereto. The bus may be classified into an address bus, a data bus, a control bus, and the like. For ease of representation, only one thick line is used to represent the bus in FIG. 10, but this does not mean that there is only one bus or only one type of bus.

In this embodiment of this application, the processor 1010 may be one or more central processing units (Central Processing Unit, CPU). When the processor 1010 is one CPU, the CPU may be a single-core CPU, or may be a multi-core CPU. The processor 1010 may be a general-purpose processor, a digital signal processor, an application-specific integrated circuit, a field programmable gate array or another programmable logic device, a discrete gate or transistor logic device, or a discrete hardware component; and may implement or perform the methods, steps, and logical block diagrams disclosed in embodiments of this application. The general-purpose processor may be a microprocessor, any conventional processor, or the like. The steps of the methods disclosed with reference to embodiments of this application may be directly performed by a hardware processor, or may be performed by using a combination of hardware in the processor and a software module.

In this embodiment of this application, the memory 1030 may include but is not limited to a nonvolatile memory such as a hard disk drive (hard disk drive, HDD) or a solid-state drive (solid-state drive, SSD), or a random access memory (Random Access Memory, RAM), an erasable programmable read-only memory (Erasable Programmable ROM, EPROM), a read-only memory (Read-Only Memory, ROM), a compact disc read-only memory (Compact Disc Read-Only Memory, CD-ROM), and the like. The memory is any other medium that can be used to carry or store expected program code in a form of instructions or a data structure and that can be accessed by a computer, but is not limited thereto. Alternatively, the memory in this embodiment of this application may be a circuit or any other apparatus that can implement a storage function, and is configured to store program instructions and/or data.

Figure 11:
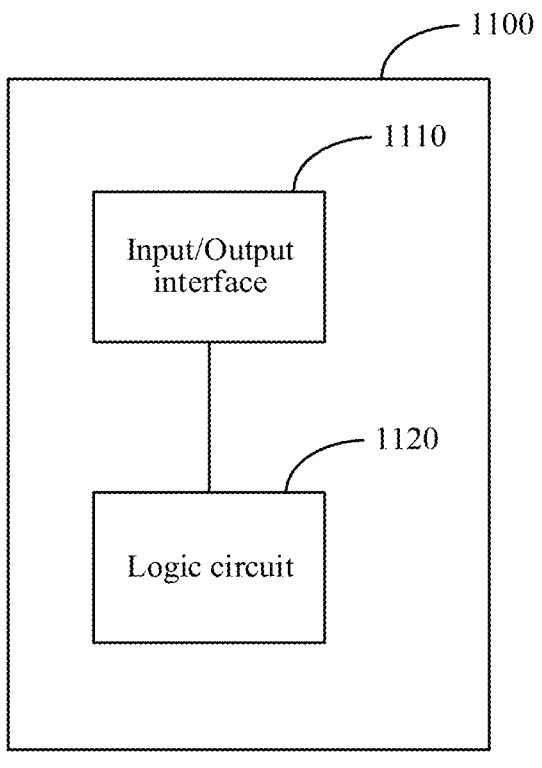
FIG. 11 is a schematic diagram of still another communication apparatus according to an embodiment of this application.

Refer to FIG. 11. An embodiment of this application further provides an apparatus 1100, configured to implement functions of a terminal and a network device in the foregoing method. The apparatus 1100 may be a communication apparatus or a chip in a communication apparatus. The communication apparatus includes:

at least one input/output interface 1110 and a logic circuit 1120. The input/output interface 1110 may be an input/output circuit. The logic circuit 1120 may be a signal processor, a chip, or another integrated circuit that can implement the method in this application.

The at least one input/output interface 1110 is configured to input or output a signal or data. For example, when the apparatus is a terminal or is used in a terminal, the input/output interface 1110 is configured to obtain first information. For example, when the apparatus is a network device or is used in a network device, the input/output interface 1110 is configured to output the first information.

The logic circuit 1120 is configured to perform a part or all of the steps in any one of the methods provided in embodiments of this application. The logic circuit may implement functions implemented by the processing unit 910 in the apparatus 900 and the processor 1010 in the apparatus 1000. For example, when the apparatus is a terminal or is used in a terminal, the apparatus is configured to perform steps performed by the terminal (first communication apparatus) in various possible implementations in the foregoing method embodiment. For example, the logic circuit 1120 is configured to determine, based on the first information, whether an access condition is met. When the apparatus is a network device or is used in a network device, the apparatus is configured to perform steps performed by the network device (second communication apparatus) in various possible implementations in the foregoing method embodiments. For example, the logic circuit 1120 is configured to determine the first information.

When the foregoing communication apparatus is a chip used in a terminal, the chip in the terminal implements a function of the terminal in the foregoing method embodiment. The chip in the terminal receives information from another module (for example, a radio frequency module or an antenna) in the terminal, where the information is sent by a network device to the terminal. Alternatively, the chip in the terminal sends information to another module (for example, the radio frequency module or the antenna) in the terminal, where the information is sent by the terminal to the network device.

When the communication apparatus is a chip used in a network device, the chip in the network device implements functions of the network device in the foregoing method embodiment. The chip in the network device receives information from another module (for example, a radio frequency module or an antenna) in the network device, where the information is sent by a terminal to the network device. Alternatively, the chip in the network device sends information to another module (for example, the radio frequency module or the antenna) in the network device, where the information is sent by the network device to the terminal.

Based on a same concept as that in the method embodiment, an embodiment of this application further provides a computer-readable storage medium. The computer-readable storage medium stores a computer program, and the computer program is executed by hardware (for example, a processor), to implement some or all steps of any method performed by any apparatus in embodiments of this application.

Based on a same concept as that in the method embodiment, an embodiment of this application further provides a computer program product including instructions. When the computer program product runs on a computer, the computer is enabled to perform some or all steps of any method in the foregoing aspects.

Based on a same concept as that in the method embodiment, this application further provides a chip or a chip system. The chip may include a processor. The chip may further include a memory (or storage module) and/or a transceiver (or communication module), or the chip is coupled to a memory (or storage module) and/or a transceiver (or communication module). The transceiver (or communication module) may be configured to support the chip in performing wired and/or wireless communication, and the memory (or storage module) may be configured to store a program. The processor may invoke the program to implement an operation performed by the terminal or the network device in any one of the method embodiment or possible implementations of the method embodiment. The chip system may include the chip, or may include the chip and another discrete component, such as a memory (or storage module) and/or a transceiver (or communication module).

Based on a same concept as that in the method embodiment, this application further provides a communication system. The communication system may include the terminal and/or the network device. The communication system may be configured to implement an operation performed by the terminal or the network device in any one of the method embodiment or possible implementations of the method embodiment. For example, the communication system may have a structure shown in FIG. 1A or FIG. 1B.

All or a part of the foregoing embodiments may be implemented by using software, hardware, firmware, or any combination thereof. When software is used to implement the foregoing embodiments, all or a part of the foregoing embodiments may be implemented in a form of a computer program product. The computer program product includes one or more computer instructions. When the computer program instructions are loaded and executed on the computer, the procedures or functions according to embodiments of this application are all or partially generated. The computer may be a general-purpose computer, a dedicated computer, a computer network, or other programmable apparatuses. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, an optical disk), a semiconductor medium (for example, a solid-state drive), or the like. In the foregoing embodiments, the description of each embodiment has respective focuses. For a part that is not described in detail in an embodiment, reference may be made to related descriptions in other embodiments.

In the foregoing embodiments, the description of each embodiment has respective focuses. For a part that is not described in detail in an embodiment, reference may be made to related descriptions in other embodiments.

In the several embodiments provided in this application, it should be understood that the disclosed apparatus may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual indirect couplings or direct couplings or communication connections may be implemented through some interfaces. The indirect couplings or communication connections between the apparatuses or units may be implemented in electronic or other forms.

When the integrated unit is implemented in a form of a software functional unit and is sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for instructing a computer device (which may be a personal computer, a server, a network device, or the like) to perform all or some of the steps of the method in embodiments of this application.

The foregoing descriptions are merely some specific implementations of this application, but are not intended to limit the protection scope of this application. Any person skilled in the art may make other changes or modifications to these embodiments within the technical scope disclosed in this application. Therefore, the appended claims are intended to be construed as including embodiments described above and the changes and modifications that fall within the scope of this application. Therefore, the protection scope of this application shall be subject to the protection scope of the claims.

What is claimed is:

1. A wireless communication method implemented by a first communication apparatus, comprising:

receiving first information, wherein the first information indicates a determining threshold of a parameter in a first parameter set, and the first parameter set comprises at least one of following parameters:

location information, delay information, a timing advance rate, a rate of the timing advance rate, a Doppler value, a Doppler rate, or remaining coverage time;

obtaining first comparison information based on location information of the first communication apparatus and/or location information of a second communication apparatus;

when a first parameter in the first parameter set has a plurality of determining thresholds, obtaining a coverage level and/or service data volume of the first communication apparatus;

selecting a corresponding determining threshold from the plurality of determining thresholds based on the coverage level and/or service data volume of the first communication apparatus;

determining, based on the first comparison information and the corresponding determining threshold of the first parameter, whether an access condition is met; and performing random access when the access condition is met.

2. The wireless communication method according to claim 1, further comprising:

before the determining, by the first communication apparatus, whether the access condition is met, obtaining, by the first communication apparatus, a correspondence between the determining threshold of the parameter in the first parameter set and a coverage level and/or service data volume.

3. The wireless communication method according to claim 1, wherein the plurality of determining thresholds comprise one reference threshold and at least one difference.

4. The wireless communication method according to claim 1, wherein the determining, based on the first comparison information and the first information, whether the access condition is met comprises:

comparing the first comparison information with the determining threshold of the parameter in the first parameter set based on a determining condition, and determining whether the access condition is met, wherein the determining condition corresponds to the determining threshold of the parameter in the first parameter set.

5. The wireless communication method according to claim 4, wherein the first information further indicates the determining condition corresponding to the determining threshold of the parameter in the first parameter set, or wherein the determining condition is a preconfigured condition, or wherein the determining condition is determined by the first communication apparatus based on the location information and/or a motion direction of the second communication apparatus.

6. The wireless communication method according to claim 1, wherein the location information is longitude and latitude information or information about at least two location points, the at least two location points are used to determine a location threshold line, and the first comparison information comprises a location of the first communication apparatus.

7. The wireless communication method according to claim 1, wherein the delay information is first delay information between a first reference line and the second communication apparatus, the first comparison information comprises second delay information between the first communication apparatus and the second communication apparatus, and the second delay information is obtained based on the location information of the first communication apparatus and the location information of the second communication apparatus.

8. The wireless communication method according to claim 1, wherein the timing advance rate is a first timing advance rate between a second reference line and the second communication apparatus, the first comparison information comprises a second timing advance rate between the first communication apparatus and the second communication apparatus, and the second timing advance rate is obtained based on the location information of the first communication apparatus and a location and speed information of the second communication apparatus.

9. The wireless communication method according to claim 8, wherein the Doppler value is a first Doppler value between a third reference line and the second communication apparatus, the first comparison information comprises a second Doppler value between the first communication apparatus and the second communication apparatus, and the second Doppler value is obtained based on the location information of the first communication apparatus and the location and the speed information of the second communication apparatus.

10. The wireless communication method according to claim 1, wherein the first information is index information, and the index information indicates a determining threshold that is of a parameter in the first parameter set and that corresponds to a cell in which the first communication apparatus is located.

11. A communication apparatus, comprising:

a memory;

one or more processors coupled to the memory and configured to receive first information, wherein the first information indicates a determining threshold of a parameter in a first parameter set, and the first parameter set comprises at least one of the following parameters: location information, delay information, a timing advance rate, a rate of the timing advance rate, a Doppler value, a Doppler rate, or remaining coverage time;

obtain first comparison information based on location information of the communication apparatus and/or location information of a second communication apparatus;

determine, based on the first comparison information and the first information, whether the access condition is met;

when a first parameter in the first parameter set has a plurality of determining thresholds, obtain a coverage level and/or service data volume of the communication apparatus;

select a corresponding determining threshold from the plurality of determining thresholds based on the coverage level and/or service data volume of the communication apparatus; and determine, based on the first comparison information and the corresponding determining threshold of the first parameter, whether an access condition is met; and perform random access when the access condition is met.

12. The communication apparatus according to claim 11, wherein the one or more processors are further configured to, before the one or more processors are configured to determine whether the access condition is met, obtain a correspondence between the determining threshold of the parameter in the first parameter set and a coverage level and/or service data volume.

13. The communication apparatus according to claim 11, wherein the plurality of determining thresholds comprise one reference threshold and at least one difference.

14. The communication apparatus according to claim 11, wherein the one or more processors are further configured to:

compare the first comparison information with the determining threshold of the first parameter based on a determining condition; and determine whether the access condition is met, wherein the determining condition corresponds to the determining threshold of the first parameter.

15. The communication apparatus according to claim 14, wherein the first information further indicates the determining condition corresponding to the determining threshold of the first parameter, or wherein the determining condition is a preconfigured condition, or wherein the determining condition is determined by the communication apparatus based on the location information and/or a motion direction of the second communication apparatus.

16. A non-transitory computer readable medium storing computer instructions, that when executed by one or more processors, cause the one or more processors to perform steps of:

receiving first information, wherein the first information indicates a determining threshold of a parameter in a first parameter set, and the first parameter set comprises at least one of following parameters:

location information, delay information, a timing advance rate, a rate of the timing advance rate, a Doppler value, a Doppler rate, or remaining coverage time;

obtaining first comparison information based on location information of a first communication apparatus and/or location information of a second communication apparatus;

when a first parameter in the first parameter set has a plurality of determining thresholds, obtaining a coverage level and/or service data volume of the first communication apparatus;

selecting a corresponding determining threshold from the plurality of determining thresholds based on the coverage level and/or service data volume of the first communication apparatus;

determining, based on the first comparison information and the corresponding determining threshold of the first parameter, whether an access condition is met; and performing random access when the access condition is met.

* * * * *